(12) United States Patent
Morita

(10) Patent No.: US 10,982,032 B2
(45) Date of Patent: Apr. 20, 2021

(54) SELF-ASSEMBLY COMPOSITION FOR PATTERN FORMATION AND PATTERN FORMING METHOD

(71) Applicant: OJI HOLDINGS CORPORATION, Tokyo (JP)

(72) Inventor: Kazuyo Morita, Tokyo (JP)

(73) Assignee: OJI HOLDINGS CORPORATION, Tokyo (JP)

(*) Notice: Subject to any disclaimer, the term of this patent is extended or adjusted under 35 U.S.C. 154(b) by 274 days.

(21) Appl. No.: 16/063,359

(22) PCT Filed: Sep. 29, 2016

(86) PCT No.: PCT/JP2016/078785
§ 371 (c)(1),
(2) Date: Jun. 18, 2018

(87) PCT Pub. No.: WO2017/110190
PCT Pub. Date: Jun. 29, 2017

(65) Prior Publication Data
US 2018/0362692 A1  Dec. 20, 2018

(30) Foreign Application Priority Data
Dec. 25, 2015 (JP) .............................. JP2015-254986

(51) Int. Cl.
| | | |
|---|---|---|
| C08F 251/00 | (2006.01) | |
| C08G 81/00 | (2006.01) | |
| C08G 81/02 | (2006.01) | |
| C08B 37/00 | (2006.01) | |
| C09D 151/00 | (2006.01) | |
| C09D 151/02 | (2006.01) | |
| C09D 187/00 | (2006.01) | |
| B82Y 40/00 | (2011.01) | |
| C08K 5/34 | (2006.01) | |

(52) U.S. Cl.
CPC ........ *C08F 251/00* (2013.01); *C08B 37/0057* (2013.01); *C08G 81/00* (2013.01); *C08G 81/02* (2013.01); *C08G 81/024* (2013.01); *C09D 151/006* (2013.01); *C09D 151/02* (2013.01); *C09D 187/005* (2013.01); *B82Y 40/00* (2013.01); *C08K 5/34* (2013.01); *Y02P 20/54* (2015.11)

(58) Field of Classification Search
CPC ..... C08F 251/00; C08G 81/024; C08G 81/02; C08G 81/00; C08B 37/0057; B82Y 40/00; C08L 5/00
See application file for complete search history.

(56) References Cited

U.S. PATENT DOCUMENTS

| | | | |
|---|---|---|---|
| 9,377,684 B2 | 6/2016 | Aissou et al. | |
| 9,718,950 B2 | 8/2017 | Minegishi et al. | |
| 2002/0193516 A1 | 12/2002 | Bucevschi et al. | |
| 2006/0210613 A1* | 9/2006 | Carliss | A61F 13/0206 424/448 |
| 2012/0264214 A1 | 10/2012 | Carlson et al. | |
| 2013/0022785 A1* | 1/2013 | Ellison | C08B 37/0006 428/141 |
| 2013/0189609 A1 | 7/2013 | Aissou et al. | |
| 2013/0344249 A1 | 12/2013 | Minegishi et al. | |

FOREIGN PATENT DOCUMENTS

| | | |
|---|---|---|
| CN | 101977839 A | 2/2011 |
| CN | 103270052 A | 8/2013 |
| CN | 103946254 A | 7/2014 |
| JP | 2003-048901 A | 2/2003 |
| JP | 2007-314585 A | 12/2007 |
| JP | 2010-091630 A | 4/2010 |
| JP | 2011-518652 A | 6/2011 |
| JP | 2013-539420 A | 10/2013 |
| JP | 2014-005325 A | 1/2014 |
| JP | 2014-527089 A | 10/2014 |
| KR | 10-2010-0123920 A | 11/2010 |
| KR | 10-2014-0041773 A | 4/2014 |
| WO | 2009/117238 A2 | 9/2009 |
| WO | 2009/117238 A3 | 9/2009 |

(Continued)

OTHER PUBLICATIONS

Loos, K., et al.; Macromolecules, 1997, vol. 30, p. 7641-7643.*
Escale, P., et al.; Macromolecules, 2011, vol. 44, p. 5911-5919.*
Toshiba Review, vol. 67, No. 4, 2012, pp. 44-47.
International Search Report and Written Opinion dated Oct. 25, 2016, issued by the International Searching Authority in application No. PCT/JP2016/078785.
International Preliminary Report on Patentability with translation of Written Opinion dated Jul. 5, 2018, issued by the International Searching Authority in corresponding application No. PCT/JP2016/078785.
Office Action dated May 26, 2020 in Japanese Application No. 2017-557741.
Application of Miyamoto Takeaki, Yamada Kenji, and sugar chain molecules to functional material; Macromolecules, Aug. 1, 1996 ; vol. 45, No. 8,p. 553-557 (6 pages total).

(Continued)

*Primary Examiner* — Robert S Jones, Jr.
(74) *Attorney, Agent, or Firm* — Sughrue Mion, PLLC

(57) ABSTRACT

An object of the present invention is to provide a self-assembly composition for pattern formation, which is capable of forming a favorable phase-separated structure even in the case of forming a large size pattern. In addition, another object of the present invention is to provide a self-assembly composition for pattern formation, which is capable of forming a pattern by a simple process, with no need for preparation of a under layer, etc., upon formation of a fine pattern structure. The present invention relates to a self-assembly composition for pattern formation, which comprises a block copolymer comprising a polymerization unit (a) comprising two or more units consisting of at least one type selected from a glucose unit and a xylose unit, and a polymerization unit (b) comprising two or more units consisting of at least one type selected from an aromatic ring-containing unit, a silicon-containing unit and a metal-containing unit.

14 Claims, 4 Drawing Sheets

(56) References Cited

FOREIGN PATENT DOCUMENTS

WO  2012/071004 A1  5/2012
WO  2012/177839 A1  12/2012

OTHER PUBLICATIONS

Office Action dated Dec. 20, 2019 in Taiwanese Application No. 105132352.
Partial European Search Report dated Jun. 13, 2019, from the European Patent Office in counterpart European Application No. 16878088.0.
Office Action dated Jul. 3, 2019, issued by the Korean Intellectual Property Office in corresponding Korean Application No. 10-2018-7016473.
Issei Otsuka, et al., "Control of 10 nm scale cylinder orientation in self-organized sugar-based block copolymer thin films", Nanoscale, The Royal Society of Chemistry, Jan. 1, 2013, vol. 5, No. 7, pp. 2637-2641 (5 pages total).
Karim Aissou, et al., "Nano-Organization of Amylose-b-Polystyrene Block Copolymer Films Doped with Bipyridine", Langmuir, American Chemical Society, Apr. 5, 2011, vol. 27, No. 7, pp. 4098-4103 (6 pages total).
Yu-Cheng Chiu et al, "High-Performance Nonvolatile Transistor Memories of Pentacene Using the Green Electrets of Sugar-based Block Copolymers and Their Supramolecules", Advanced Functional Materials, XP055612179, vol. 24, No. 27, Jul. 1, 2014, pp. 4240-4249 (10 pages total).
Zi-Chen Li et al, "Synthesis of amphiphilic block copolymers with well-defined glycopolymer segment by atom transfer radical polymerization", Macromolecular Rapid Communications, XP055612142, vol. 21, No. 7, Apr. 1, 2000, pp. 375-380 (6 pages total).
Yu-Zeng Liang et al, "Multiple morphologies of molecular assemblies formed by polystyrene-block-poly[2-(β-D-glucopyranosyloxy)ethyl acrylate] in water", New Journal of Chemistry, XP055612158, vol. 24, No. 5, Jan. 1, 2000, pp. 323-328 (6 pages total).
Kohji Ohno et al, "Synthesis of a well-defined glycopolymer by atom transfer radical polymerization", Journal of Polymer Science, Part A: Polymer Chemistry, XP055612192, vol. 36, No. 14, Oct. 1, 1998, pp. 2473-2481 (9 pages total).
Bei-Bei Ke et al., "Controlled synthesis of linear and comb-like glycopolymers for preparation of honeycomb-patterned films", Polymer, Elsevier Ltd., vol. 51, 2010, pp. 2168-2176 (9 pages total).
Extended European Search Report dated Aug. 20, 2019, from the European Patent Office in European application No. 16878088.0.
Office Action dated Oct. 3, 2019, from the Korean Intellectual Property Office in Korean application No. 10-2018-7016473.
Communication dated Jun. 30, 2020, issued by the State Intellectual Property Office of the P.R.C. in Chinese application No. 201680075799.8.
Zhang, Jun, "Green Coordination Catalysis", Gansu Cultural Press, pp. 54-55 (Publication date: Nov. 30, 2009), 4 pages in total.

* cited by examiner

SELF-ASSEMBLY COMPOSITION FOR PATTERN FORMATION AND PATTERN FORMING METHOD

CROSS REFERENCE TO RELATED APPLICATIONS

This application is a National Stage of International Application No. PCT/JP2016/078785 filed Sep. 29, 2016, claiming priority based on Japanese Patent Application No. 2015-254986 filed Dec. 25, 2015.

TECHNICAL FIELD

The present invention relates to a self-assembly composition for pattern formation and a pattern forming method.

BACKGROUND ART

Electronic devices such as semiconductors have been required to be highly integrated as a result of miniaturization thereof. With regard to the patterns of semiconductors, miniaturization and the diversification of the shapes have been studied. As such pattern forming methods, a double patterning method, a lithography method using electron beam, and a pattern forming method involving directed self-assembly using a directed self-assembly material (hereafter also referred to as a "self-assembly composition for pattern formation") have been known.

Since the self-assembly composition for pattern formation undergoes phase separation for self-assembly, it does not need an expensive electron beam drawing device and does not cause complicated patterning processes found in the double patterning method. Accordingly, the self-assembly composition for pattern formation is advantageous in terms of costs. As such self-assembly compositions for pattern formation, for example, diblock copolymers such as polystyrene-polymethyl methacrylate (PS-PMMA) have been known (for example, Non-Patent Document 1). In Non-Patent Document 1, PS-PMMA is applied onto a guide pattern, and is then heated to form a phase-separated structure. Thereafter, an etching step is performed, so that a region consisting of a polymerization unit on one side of the diblock copolymer is removed, thereby forming a fine pattern.

As such a self-assembly composition for pattern formation, the use of a material other than PS-PMMA has also been studied. For example, Patent Document 1 discloses a self-assembly composition for pattern formation, which comprises, as a main chain, a styrene-based polymer, an acryl-based polymer or the like, and has a group containing a heteroatom at the terminus thereof. In Patent Document 2, formation of a sufficiently fine pattern by using a self-assembly composition for pattern formation as described above has been studied.

PRIOR ART DOCUMENTS

Patent Documents

Patent Document 1: JP-A-2014-5325

Non-Patent Documents

Non-Patent Document 1: Toshiba Review Vol. 67, No. 4, 2012, pp. 44-47

SUMMARY OF INVENTION

Object to be Solved by the Invention

PS-PMMA has been frequently used as a self-assembly composition that forms a pattern by phase separation. Although PS-PMMA is a material excellent in forming a pattern with a size of smaller than 30 nm, it has been problematic in that it is difficult for PS-PMMA to control the degree of polymerization upon formation of a pattern with a size of 30 nm or more. In addition, PS-PMMA has also been problematic in that a favorably phase-separated structure cannot be formed due to the limitation of the phase separation ability of the material itself, or in that an extremely long annealing time (heating time) is required to form a phases-separated structure.

Moreover, it has been considered that a sufficiently fine pattern can be formed when such a self-assembly composition for pattern formation as described in Patent Document 1 is used. However, it is necessary to prepare a under layer for carrying out phase separation, and thus, time and effort have been required, for example, upon formation of a fine pattern structure with a size of 10 nm or less. Furthermore, as a result of the studies conducted by the present inventors, it has keen revealed that, even in the case of using such a self-assembly composition for pattern formation as described in Patent Document 1, it is difficult to control the degree of polymerization, when a pattern with a size of 30 nm or more is formed, and thus that a favorable phase-separated structure cannot be formed.

Hence, in order to solve the aforementioned problems of prior art techniques, the present inventors have conducted studies for the purpose of providing a self-assembly composition for pattern formation, which is capable of forming a favorable phase-separated structure even in the ease of forming a large size pattern. Further, the present inventors have conducted studies for the purpose of providing a self-assembly composition for pattern formation, which is capable of forming a pattern by a simple process, with no need for preparation of a under layer, etc., upon formation of a fine pattern structure Means for Solving the Object As a result of intensive studies conducted directed towards achieving the aforementioned objects, the present inventors have found that, even in the case of forming a large size pattern, a favorable phase-separated structure can be formed by allowing a self-assembly composition for pattern formation to comprise a block copolymer comprising a polymerization unit comprising two or more units consisting of at least one type selected from a glucose unit and a xylose unit, and a polymerization unit (b) comprising two or more units consisting of at least one type selected from an aromatic ring-containing unit, a silicon-containing unit and a metal-containing unit. Moreover, the present inventors have also found that even in the case of forming a fine pattern structure, a pattern can be formed in a simple process by using the self-assembly composition for pattern formation having the above-described configured, thereby completing the present invention.

Specifically, the present invention has the following configurations.

[1] A self-assembly composition for pattern formation, which comprises a block copolymer comprising a polymerization unit (a) comprising two or more units consisting of at least one type selected from a glucose unit and a xylose unit, and a polymerization unit (b) comprising two or more units consisting of at least one type selected from an aromatic ring-containing unit, a silicon-containing unit and a metal-containing unit.

[2] The self-assembly composition for pattern formation according to [1], wherein the polymerization unit (a) has a structure represented by the following formula (1) or the following formula (2):

[Formula 1]

Formula (1)

[Formula 2]

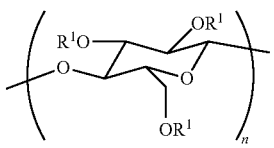

Formula (2)

wherein $R^1$ each independently represents a hydrogen atom, a fluorine atom, a bromine atom, a chlorine atom, an iodine atom, an alkyl group, an acyl group, an aryl group or a phosphoryl group, and a plurality of $R^1$ may be identical to or different from one another; and n represents an integer of 2 or more and 1500 or less.

[3] The self-assembly composition for pattern formation according to [1] or [2], wherein the polymerization unit (a) is a xylan derivative or a xylooligosaccharide.

[4] The self-assembly composition for pattern formation according to [1], wherein the polymerization unit (a) has a structure represented by the following formula (3) or the following formula (4):

[Formula 3]

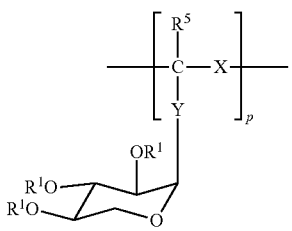

Formula (3)

[Formula 4]

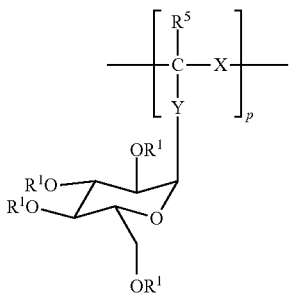

Formula (4)

wherein $R^1$ each independently represent a hydrogen atom, a fluorine atom, a bromine atom, a chlorine atom, an iodine atom, an alkyl group, an acyl group, an aryl group or a phosphoryl group, and a plurality of $R^1$ may be identical to or different from one another; $R^5$ represents a hydrogen atom or an alkyl group, and a plurality of $R^5$ may be identical to or different from one another; X and Y each independently represent a single bond or a linking group, wherein a plurality of X may be identical to or different from one another, and a plurality of Y may be identical to different from one another; and p represents an integer of 2 or more and 1500 or less.

[5] The self-assembly composition for pattern formation according to any one of [1] to [4], wherein the polymerization unit (b) comprises the aromatic ring-containing units.

[6] The self-assembly composition for pattern formation according to any one of [1] to [5], wherein the polymerization unit (b) comprises benzene ring-containing units.

[7] The self-assembly composition for pattern formation according to any one of [1] to [6], wherein the polymerization unit (b) comprises a styrene-based polymer.

[8] The self-assembly composition for pattern formation according to any one of [1] to [3], wherein the block copolymer is represented by the following formula (11) or the following formula (12):

[Formula 5]

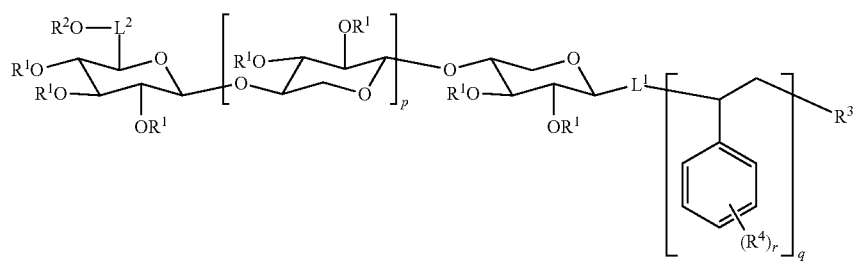

Formula (11)

[Formula 6]

-continued

Formula (12)

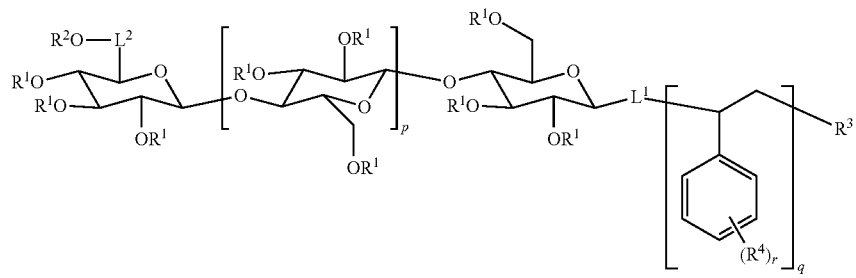

wherein $R^1$ each independently represents a hydrogen atom, a fluorine atom, a bromine atom, a chlorine atom, an iodine atom, an alkyl group, an acyl group, an aryl group or a phosphoryl group, and a plurality of $R^1$ may be identical to or different from one another; $R^2$ represents a hydrogen atom or a substituent, $R^3$ represents a hydrogen atom or a substituent, and $R^4$ represents a hydrogen atom, a halogen atom, a hydroxyl group, an alkyl group, an acyl group, a trimethylsilyl group or a 1,1,2,2,2-pentamethyldisilyl group; $L^1$ represents a single bond or a linking group, and $L^2$ represent a single bond or an alkylene group; and p represents an integer of 2 or more and 1500 or less, q represents an integer of 2 or more and 3000 or less, and r represents an integer of 0 or more and 5 or less.

The self-assembly composition for pattern formation according to [4], wherein the block copolymer is represented by the following formula (13) or the following formula (14):

[Formula 7]

Formula (13)

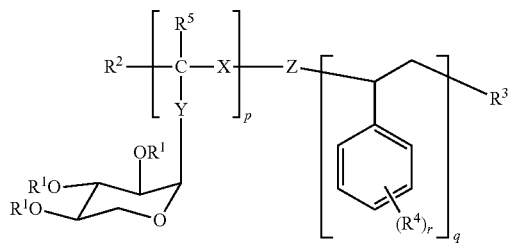

[Formula 8]

Formula (14)

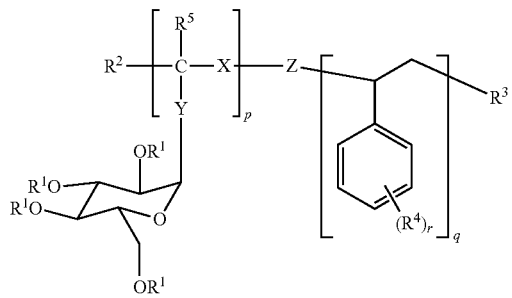

wherein $R^1$ each independently represents a hydrogen atom, a fluorine atom, a bromine atom, a chlorine atom, an iodine atom, an alkyl group, an acyl group, an aryl group or a phosphoryl group, and a plurality of $R^1$ may be identical to or different from one another; $R^2$ represents a hydrogen atom or a substituent, $R^3$ represents a hydrogen atom or a substituent, $R^4$ represents a hydrogen atom, a halogen atom, a hydroxyl group, an alkyl group, an acyl group, a trimethylsilyl group or a 1,1,2,2,2-pentamethyldisilyl group, $R^5$ represents a hydrogen atom or an alkyl group, and a plurality of $R^5$ may be identical to or different from one another; X, Y and Z each independently represent a single bond or a linking group, wherein a plurality of X may be identical to different from one another, and a plurality of Y may be identical to different from one another; and p represents an integer of 2 or more and 1500 or less, q represents an integer of 2 or more and 3000 or less, and r represents an integer of 0 or more and 5 or less.

[10] The self-assembly composition for pattern formation according to any one of claims 1 to 9, which further comprises an organic solvent.

[11] The self-assembly composition for pattern formation according to any one of [1] to [10], which further comprises an ionic liquid.

[12] A pattern forming method, comprising
applying the self-assembly composition for pattern formation according to any one of claims 1 to 11 on a substrate, so as to form a self-assembly film according to self-assembly phase separation, and
subjecting to etching.

[13] The pattern forming method according to [12], wherein the etching is a dry etching.

[14] The pattern forming method according to [12] or [13], which further comprises forming a guide pattern on the substrate before forming the pattern.

Advantageous Effects of Invention

According to the present invention, a self-assembly composition for pattern formation, which is capable of forming a favorable phase-separated structure even in the case of forming a large size pattern, can be obtained. Moreover, even in the case of forming a fine pattern structure, a pattern can be formed in a simple process by using the self-assembly composition for pattern formation of the present invention. The self-assembly composition for pattern formation of the present invention is a material suitable for formation of all sizes of patterns.

EMBODIMENTS OF CARRYING OUT THE INVENTION

Figure 1A:
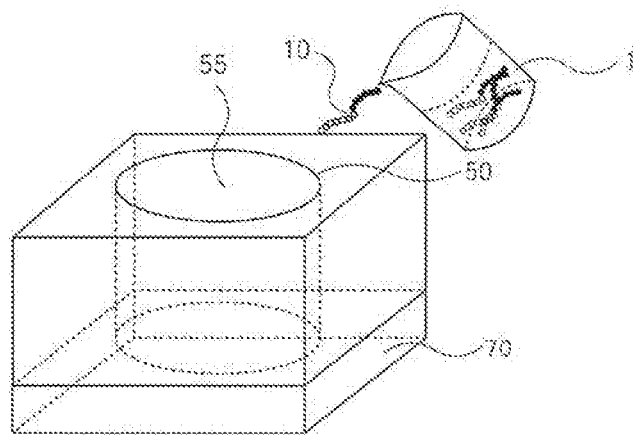
FIGS. 1(*a*)-1(*c*) are schematic views showing a pattern-forming step.

Hereinafter, the present invention will be described in detail. The below-mentioned constituent features will be explained based on representative embodiments or specific examples in some cases. However, the present invention is not limited to such embodiments. It is to be noted that substituents, which are not explicitly mentioned regarding substitution and/or non-substitution, are understood that the substituents may optionally have any given substituents.

(Self-Assembly Composition for Pattern Formation)

The present invention relates to a self-assembly composition for pattern formation, which comprises a block copolymer comprising a polymerization unit (a) and a polymerization unit (b). Herein, the polymerization unit (a) comprises two or more units consisting of at least one type selected from a glucose unit and a xylose unit. The polymerization unit (b) comprises two or more units consisting of at least one type selected from an aromatic ring-containing unit, a silicon-containing unit and a metal-containing unit.

The term "directed self-assembly" is used in the present description to mean a phenomenon, which is not caused by only control by external factors, but spontaneously constructs formation or structures. In the present invention, a self-assembly composition for pattern formation is applied onto, for example, a substrate, and annealing and the like are then carried out, so that a film having a phase-separated structure (a self-assembly film) can be formed by directed self-assembling, and thereafter, a part of phase is removed from this self-assembly film, so that a pattern can be formed.

Since the self-assembly composition for pattern formation of the present invention has the above-described configuration, the polymerization degree of the block copolymer can be controlled, and also, phase separation performance can be enhanced. Thus, even in the case of forming a large size pattern, a favorable phase-separated structure can be formed. In addition, even in a case where the self-assembly composition for pattern formation of the present invention is used to form, for example, a fine pattern structure with a size of 10 nm or less, formation of a under layer and the like is not essential, and a pattern can be formed in a simple process.

In the present invention, since there is a large difference in terms of hydrophilicity (hydrophobicity) between the polymerization unit (a) and the polymerization unit (b), phase separation performance is high. Specifically, since the polymerization unit (a) has high hydrophilicity and the polymerization unit (b) has high hydrophobicity, all sizes of patterns can be formed. As such, the self-assembly composition for pattern formation of the present invention is a material suitable for formation of all sizes of patterns. It is to be noted that, in the present description, the size of a pattern is a pitch size corresponding to each component in a phase-separated structure. Specifically, the pitch size of a portion consisting of polymerization units that remain after completion of the etching step is referred to as a pattern size.

Moreover, the self-assembly composition for pattern formation of the present invention is also characterized in that it has a large difference in the etching rate after formation of a phase-separated structure. Specifically, the etching rate of a region consisting of the polymerization unit (a) comprising two or more units consisting of at least one type selected from a glucose unit and a xylose unit is high, whereas the etching rate of a region consisting of the polymerization unit (b) comprising two or more units consisting of at least one type selected from an aromatic ring-containing unit, a silicon-containing unit and a metal-containing unit is low, and thus, the etching step can be efficiently carried out. Furthermore, the pattern shape after completion of the etching can be easily processed into a desired shape.

(Block Copolymer)

A block copolymer comprises a polymerization unit (a) and a polymerization unit (b). The polymerization unit (a) comprises two or more units consisting of at least one type selected from a glucose unit and a xylose unit, and the polymerization unit (b) comprises two or more units consisting of at least one type selected from an aromatic ring-containing unit, a silicon-containing unit and a metal-containing unit. The block copolymer is preferably an A-B type diblock copolymer comprising the polymerization unit (a) and the polymerization unit (b), but it may also be a block copolymer comprising a plurality of polymerization units (a) and a plurality of polymerization units (b).

The weight average molecular weight (Mw) of the block copolymer is preferably 500 or more, more preferably 1000 or more, and further preferably 1500 or more. On the other hand, the weight average molecular weight (Mw) of the block copolymer is preferably 1,000,000 or less, more preferably 500,000 or less, even more preferably 300,000 or less, and further preferably 250,000 or less. By setting the weight average molecular weight (Mw) of the block copolymer within the above-described range, even in the case of forming a large size pattern, a favorable phase-separated structure can be formed. Moreover, even in the case of forming a fine pattern structure, a pattern can be formed in a simple process.

The ratio (Mw/Mn) between the weight average molecular weight (Mw) of the block copolymer and the number average molecular weight (Mn) of the block copolymer is preferably 1 or more. In addition, Mw/Mn is preferably 2 or less, more preferably 1.5 or less, and further preferably 1.3 or less. By setting Mw/Mn within the above-described range, the subassembly composition for pattern formation of the present invention can be used to form a fine, good pattern structure with higher accuracy.

The block copolymer is preferably represented by the following formula (11) or the following formula (12).

[Formula 9]

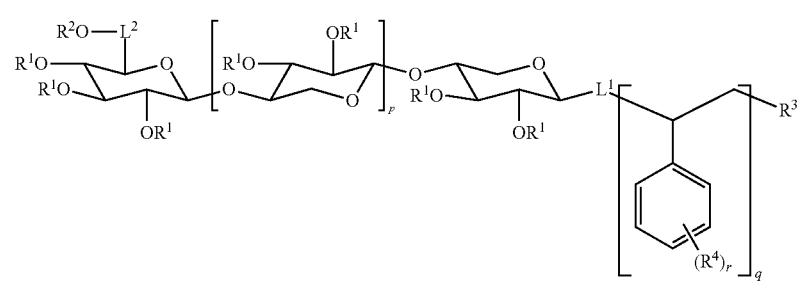

Formula (11)

[Formula 10]

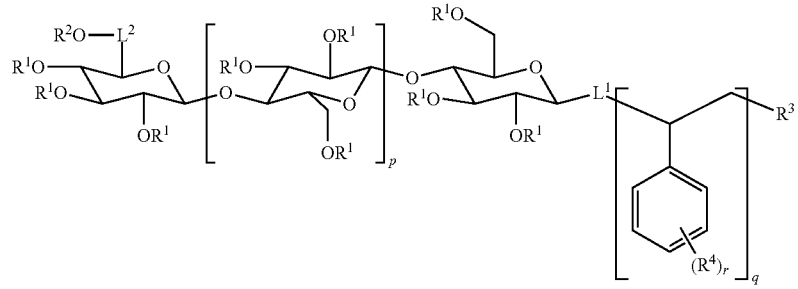

Formula (12)

In the formulae (11) and (12), $R^1$ each independently represents a hydrogen atom, a fluorine atom, a bromine atom, a chlorine atom, an iodine atom, an alkyl group, an acyl group, an aryl group or a phosphoryl group, and a plurality of $R^1$ may be identical to or different from one another. $R^2$ represents a hydrogen atom or a substituent, $R^3$ represents a hydrogen atom or a substituent, and $R^4$ represents a hydrogen atom, a halogen atom, a hydroxyl group, an alkyl group, an acyl group, a trimethylsilyl group or a 1,1,2,2,2-pentamethyldisilyl group. $L^1$ represents a single bond or a linking group, and $L^2$ represents a single bond or an alkylene group. p represents an integer of 2 or more and 1500 or less, q represents an integer of 2 or more and 3000 or less, and r represents an integer of 0 or more and 5 or less.

In the formulae (11) and (12), $R^1$ each independently represents a hydrogen atom, a fluorine atom, a bromine atom, a chlorine atom, an iodine atom, an alkyl group, an acyl group, an aryl group or a phosphoryl group. Among others, preferably, $R^1$ each independently represents a hydrogen atom or an acyl group containing 1 or more and 3 or less carbon atoms. In the formulae (11) and (12), a plurality of $R^1$ may be identical to or different front one another. It is to be noted that the above-described alkyl group comprises a sugar chain, and the block copolymer may have a branched structure.

When $R^1$ is an alkyl group or an acyl group, the number of carbon atoms contained in the group can be selected as appropriate, depending on purpose. For example, the number of carbon atoms is preferably 2 or more, and it is also preferably 200 or less, more preferably 100 or less, further preferably 20 or less, and particularly preferably 4 or less.

Specific examples of $R^1$ include: a hydrogen atom; acyl groups such as an acetyl group, a propanoyl group, a butyryl group, an isobutyryl group, a valeryl group, an isovaleryl group, a pivaloyl group, a hexanoyl group, an octanoyl group, a chloroacetyl group, a trifluoroacetyl group, a cyclopentanecarbonyl group, a cyclohexanecarbonyl group, a benzoyl group, a methoxybenzoyl group, or a chlorobenzoyl group; and alkyl groups such as a methyl group, an ethyl group, a propyl group, a butyl group, or a t-butyl group. Among these examples, a hydrogen atom, an acetyl group, a propanoyl group, a butyryl group, and an isobutyryl group are preferable, and a hydrogen atom or an acetyl group is particularly preferable.

In the formulae (11) and (12), $R^2$ represents a hydrogen atom or a substituent. Examples of such a substituent include: a fluorine atom, a chlorine atom, a bromine atom, an iodine atom; acyl groups such as an acetyl group, a propanoyl group, a butyryl group, an isobutyryl group, a valeryl group, an isovaleryl group, a pivaloyl group, a hexanoyl group, an octanoyl group, a chloroacetyl group, a trifluoroacetyl group, a cyclopentanecarbonyl group, a cyclohexanecarbonyl group, a benzoyl group, a methoxybenzoyl group, or a chlorobenzoyl group; and alkyl groups such as a methyl group, an ethyl group, a propyl group, a butyl group, or a t-butyl group. $R^2$ is preferably a hydrogen atom, an acetyl group, a propanoyl group, a butyryl group, or an isobutyryl group, and particularly preferably a hydrogen atom or an acetyl group.

It is to be noted that $R^2$ may comprise, as a substituent, a group comprising two or more units consisting of at least one type selected from an aromatic ring-containing unit, a silicon-containing unit and a metal-containing unit, or may also comprise, as a substituent, a group in which at least one of the aforementioned group is combined with at least one group comprising two or more units consisting of at least one type selected from a glucose unit and a xylose unit. That is to say, the block copolymer may be a polymer comprising two or more polymerization units (b), or may also be a polymer having a structure of B-A-B type or B-A-B-A type.

In the formulae (11) and (12), $R^3$ represents a hydrogen atom or a substituent. Examples of the substituent include a hydrogen atom, a fluorine atom, a bromine atom, a chlorine atom, an iodine atom, a hydroxyl group, an acetyl group, a propanoyl group, a butyryl group, a methyl group, an ethyl group, a propyl group, a butyl group, a t-butyl group, a trimethylsilyl group, and groups represented by the following structural formulae.

[Formula 11]

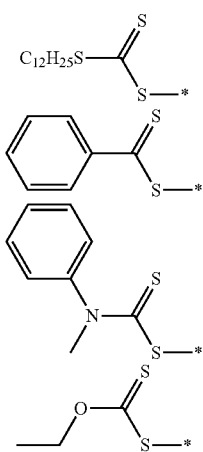

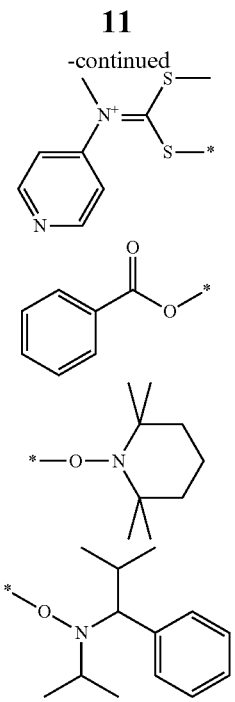

In the above structural formulae, the symbol * indicates a binding moiety with an aromatic ring-containing unit.

It is to be noted that $R^3$ may comprise, as a substituent, a group comprising two or more units consisting of at least one type selected from a glucose unit and a xylose unit, or may also comprise, as a substituent, a group in which at least one of the aforementioned group is combined with at least one group comprising two or more units consisting of at least one type selected from an aromatic ring-containing unit, a silicon-containing unit and a metal-containing unit. That is to say, the block copolymer may be a polymer comprising two or more polymerization units (a), or may also be a polymer having a structure of A-B-A type or A-B-A-B type.

In the formulae (11) and (12), $R^4$ represents a hydrogen atom, a halogen atom, a hydroxyl group, an alkyl group, an acyl group, a trimethylsilyl group or a 1,1,2,2,2-pentamethyldisilyl group. Among other, $R^4$ is preferably a hydrogen atom, r represents an integer of 0 or more and 5 or less, and when r is 2 or more, a plurality of $R^4$ may be identical or different from one another.

In the formulae (11) and (12), $L^1$ represents a single bond or a linking group. Examples of the linking group include —O—, an alkylene group, a disulfide group, and groups represented by the following structural formulae. When L is an alkylene group, the carbon atoms in the alkylene group may be substituted with heteroatoms, and examples of the heteroatom include a nitrogen atom, an oxygen atom, a sulfur atom, and a silicon atom. In addition, when L is a linking group, the length of the linking group is preferably shorter than the length of the polymerization unit (a) or the polymerization unit (b).

[Formula 12]

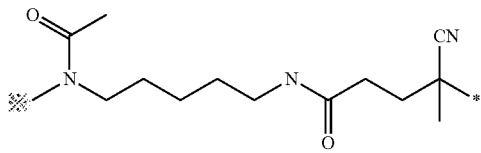

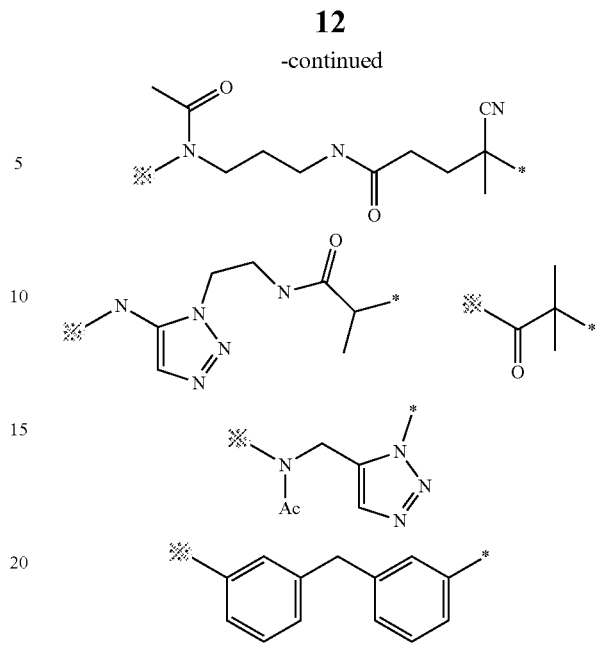

In the above structural formulae, the symbol * represents a binding moiety with an aromatic ring-containing unit, and the symbol ⊗ represents a binding moiety with a glucose unit or a xylose unit.

In the formulae (11) and (12), $L^2$ represents a single bond or an alkylene group. In the formula (11), $L^2$ is preferably a single bond or a methylene group, and more preferably a single bond. In the formula (12), $L^2$ is preferably a single bond or a methylene group, and more preferably a methylene group.

In the formulae (11) and (12), p may be 2 or more, and is preferably 3 or more, more preferably 4 or more, and further preferably 5 or more. On the other hand, p may be 1500 or less, and is preferably 1200 or less, more preferably 1000 or less, and further preferably 800 or less.

In the formulae (11) and (12), q may be 2 or more, and is preferably 3 or more, more preferably 4 or more, and further preferably 5 or more. On the other hand, q may be 3000 or less, and is preferably 2000 or less, and more preferably 1500 or less.

The unit ratio between the polymerization unit (a) and the polymerization unit (b) in the block copolymer is preferably 1:9 to 9:1, and more preferably 1:9 to 5:5. That is to say, in the formulae (11) and (12), p:q is preferably 1:9 to 9:1, and more preferably 1:9 to 5:5. Besides, the above-described ratio can be adjusted, as appropriate, depending on the shape of a pattern. For example, when the block copolymer forms a lamellar phase-separated structure, the unit ratio between the polymerization unit (a) and the polymerization unit (b) is preferably 3:7 to 7:3. On the other hand, when the block copolymer forms a cylinder-type phase-separated structure having a sugar chain therein, the component ratio between the polymerization unit (a) and the polymerization unit (b) is preferably 2:8 to 5:5. It is to be noted that the unit ratio means the ratio between the number of units constituting the polymerization unit (a) and the number of units constituting the polymerization unit (b).

Also, the block copolymer is preferably represented by the following formula (13) or the following formula (14).

[Formula 13]

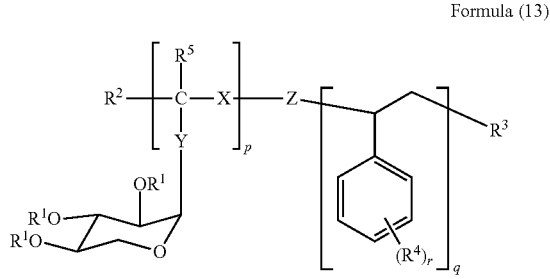

Formula (13)

[Formula 14]

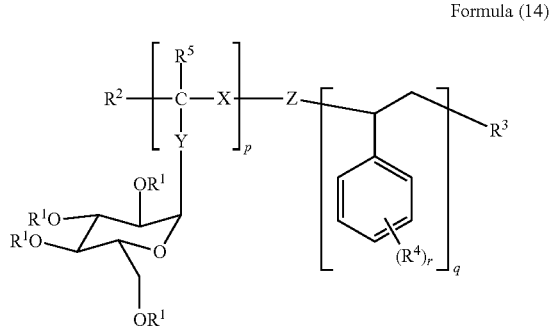

Formula (14)

In the formulae (13) and (14), $R^1$ each independently represents a hydrogen atom, a fluorine atom, a bromine, a chlorine atom, an iodine atom, an alkyl group, an acyl group, an aryl group or a phosphoryl group, and a plurality of $R^1$ may be identical to or different from one another. $R^2$ represents a hydrogen atom or a substituent, $R^3$ represents a hydrogen atom or a substituent, $R^4$ represents a hydrogen atom, a halogen atom, a hydroxyl group, an alkyl group, an acyl group, a trimethylsilyl group or a 1,1,2,2,2-pentamethyldisilyl group, $R^5$ represents a hydrogen atom or an alkyl group, and a plurality of $R^5$ may be identical to or different from one another. X, Y and Z each independently represent a single bond or a linking group, wherein a plurality of X may be identical to different from one another, and a plurality of Y may be identical to different from one another. p represents an integer of 2 or more and 1500 or less, q represents an integer of 2 or more and 3000 or less, and r represents an integer of 0 or more and 5 or less.

The preferred range of $R^1$ in the formulae (13) and (14) is the same as the preferred range of $R^1$ in the formulae (11) and (12).

In the formulae (13) and (14), $R^2$ represents a hydrogen atom or a substituent. Examples of the substituent include a fluorine atom, a chlorine atom, a bromine atom, an iodine atom, an alkyl group, an acyl group, and an aryl group. Among others, $R^2$ is preferably a hydrogen atom or an alkyl group.

The preferred range of $R^3$ in the formulae (13) and (14) is the same as the preferred range of $R^3$ in the formulae (11) and (12).

The preferred range of $R^4$ in the formulae (13) and (14) is the same as the preferred range of $R^4$ in the formulae (11) and (12). In the formulae (13) and (14), r represents an integer of 0 or more and 5 or less.

In the formulae (13) and (14), $R^5$ represents a hydrogen atom or an alkyl group, and a plurality of $R^5$ may be identical to or different from one another. Among others, $R^5$ is preferably a hydrogen atom or an alkyl group containing 1 or more and 3 or less carbon atoms, and is particularly preferably a hydrogen atom or a methyl group.

In the formulae (13) and (14), X, Y and Z each independently represent a single bond or a linking group, wherein a plurality of X may be identical to different from one another, and a plurality of Y may be identical to different from one another.

When X is a linking group, such X can be a group such as an alkylene group, —O—, —$NH_2$—, or a carbonyl group. X is preferably a single bond, or an alkylene group containing 1 or more and 6 or less carbon atoms, and is mote preferably an alkylene group containing 1 or more and 3 or less carbon atoms.

When Y is a linking group, such Y can be a group such as an alkylene group, —O—, or —C(=O)O—. Among others, preferred examples of Y include linking groups represented by the following structural formulae.

[Formula 15]

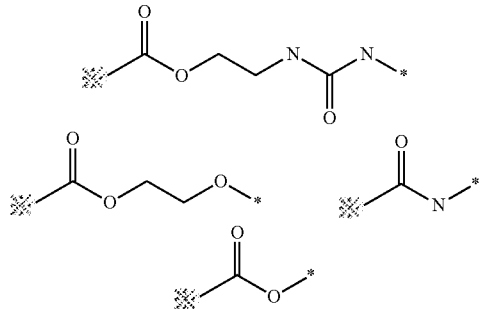

In the above structural formulae, the symbol * indicates a binding moiety with a main chain, and the symbol ⨉ indicates a binding moiety with a glucose unit or a xylose unit.

The preferred range of Z in the formulae (13) and (14) is the same as the preferred range of $L^1$ in the formulae (11) and (12).

In the formulae (13) and (14), p represents an integer of 2 or more and 1500 or less, and q represents an integer of 2 or more and 3000 or less. The preferred ranges of p and q in the formulae (13) and (14) are the same as the preferred ranges of p and q in the formulae (11) and (12), respectively.

<Polymerization Unit (a)>

The polymerization unit (a) comprises two or more units consisting of at least one type selected from a glucose unit and a xylose unit. Among others, the polymerization unit (a) preferably comprises a xylose unit.

The glucose unit constituting the polymerization unit (a) may be either α-glucose or β-glucose, but it is preferably β-glucose. In addition, the xylose unit constituting the polymerization unit (a) may be either α-xylose or β-xylose, but it is preferably β-xylose.

The polymerization unit (a) may have a structure in which two or more units consisting of at least one type selected from a glucose unit and a xylose unit are linked to one another via an α-1,4-glucoside bond, or may also have a structure in which two or more units consisting of at least one type selected from a glucose unit and a xylose unit are linked to one another via a β-1,4-glucoside bond. Moreover, the polymerization unit (a) may have a structure in which two or more glucose units are linked to one another via an α-1,6-glucoside bond, or may also have a structure in which two or more glucose units are linked to one another via a β1,6-glucoside bond. Among others, the polymerization unit (a) preferably has a structure in which two or more units consisting of at least one type selected from a glucose unit and a xylose unit are linked to one another via a β-1,4-glucoside bond, and more preferably has a structure in which two or more xylose units are linked to one another via a β-1,4-glucoside bond.

Furthermore, the polymerization unit (a) may have both a structure in which two or more units consisting of at least one type selected from a glucose unit and a xylose unit are linked to one another via a β-1,4-glucoside bond, and a structure in which two or more glucose units are linked to one another via a β-1,6-glucoside bond. That is to say, the main chain of the polymerization unit (a) may be a linear structure, or may also have a branched structure.

Among others, the polymerization unit (a) preferably has a structure represented by the following formula (1) or the following formula (2).

[Formula 16]

Formula (1)

[Formula 17]

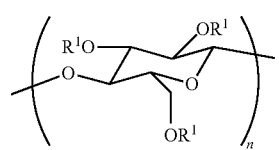

Formula (2)

In the formulae (1) and (2), $R^1$ each independently represents a hydrogen atom, a fluorine atom, a bromine atom, a chlorine atom, an iodine atom, an alkyl group, an acyl group, an aryl group or a phosphoryl group, and a plurality of $R^1$ may be identical to or different from one another; and n represents an integer of 2 or more and 1500 or less. Among others, the polymerization unit (a) preferably has a structure represented by the formula (1).

In the formulae (1) and (2), $R^1$ each independently represents a hydrogen atom, a fluorine atom, a bromine atom, a chlorine atom, an iodine atom, an alkyl group, an acyl group, an aryl group or a phosphoryl group. Among others, preferably, $R^1$ each independently represents a hydrogen atom, or an acyl group containing 1 or more and 3 or less carbon atoms. Besides, the above-described alkyl group comprises a sugar chain. That is, the polymerization unit (a) may have a branched chain.

When $R^1$ is an alkyl group or an acyl group, the number of carbon atoms contained in the group can be selected, as appropriate, depending on purpose. For example, the number of carbon atoms is preferably 2 or more, and is also preferably 200 or less, more preferably 100 or less, further preferably 20 or less, and particularly preferably 4 or less.

Specific examples of $R^1$ include: acyl groups such as an acetyl group, a propanoyl group, a butyryl group, an isobutyryl group, a valeryl group, an isovaleryl group, a pivaloyl group, a hexanoyl group, an octanoyl group, a chloroacetyl group, a trifluoroacetyl group, a cyclopentanecarbonyl group, a cyclohexanecarbonyl group, a benzoyl group, a methoxybenzoyl group, or a chlorobenzoyl group; and alkyl groups, such as a methyl group, an ethyl group, a propyl group, a butyl group, or a t-butyl group. Among these examples, an acetyl group, a propanoyl group, a butyryl group, and an isobutyryl group are preferable, and an acetyl group is particularly preferable.

In the formulae (1) and (2), n may be 2 or more, and is preferably 3 or more, more preferably 4 or more, and further preferably 5 or more. On the other hand, n may be 1500 or less, and is preferably 1200 or less, more preferably 1000 or less, and further preferably 800 or less.

The average polymerization degree of the glucose unit or the xylose unit is the same as the preferred range of the above-described n. The average polymerization degree of the glucose unit or the xylose unit can be calculated by the following measurement method. First, a solution containing the polymerization unit (a) is maintained at 50° C., and is centrifugal at 15000 rpm for 15 minutes to remove insoluble matters. Thereafter, the amount of total sugar and the amount of reducing sugar (both relative to xylose) in the supernatant are measured. The amount of total sugar is divided by the amount of reducing sugar to calculate an average polymerization degree.

When the above-described measurement method cannot be adopted, gel permeation chromatography, size exclusion chromatography, a light scattering method, a viscosity method, an end-group analysis method, a sedimentation velocity method, etc. may be adopted.

The polymerization unit (a) preferably comprises sugar. The sugar is preferably at least one selected from among a cellulose derivative, a hemicellulose derivative and a xylooligosaccharide derivative. It is more preferably a hemicellulose derivative or a xylooligosaccharide derivative, it is further preferably a xylan derivative or a xylooligosaccharide derivative, and it is particularly preferably xylan or xylooligosaccharide.

The polymerization unit (a) may comprise a sugar chain as the main chain thereof, and it may also have a structure in which a sugar chain is bound as a side chain of the main chain that is other than such a sugar chain. That is, the polymerization unit (a) may have a structure represented by the following formula (3) or the following formula (4).

[Formula 18]

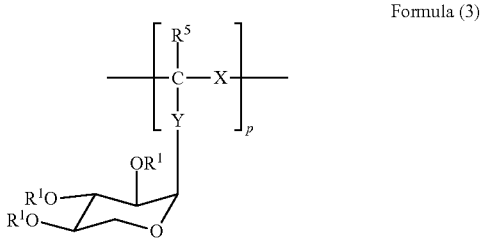

Formula (3)

[Formula 19]

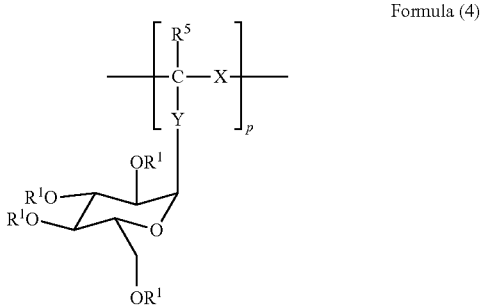

Formula (4)

In the formulae (3) and (4), $R^1$ each independently represents a hydrogen atom, a fluorine atom, a bromine atom, a chlorine atom, an iodine atom, an alkyl group, an acyl group, an aryl group or a phosphoryl group, and a plurality of $R^1$ may be identical to or different from one another; $R^5$ represents a hydrogen atom or an alkyl group, and a plurality of $R^5$ may be identical to or different from one another; X and Y each independently represent a single bond or a linking group, wherein a plurality of X may be identical to or different from one another, and a plurality of Y may be identical to different from one another; and p represents an integer of 2 or more and 1500 or less.

The preferred range of $R^1$ in the formulae (3) and (4) is the same as the preferred range of $R^1$ in the formulae (1) and (2).

In the formulae (3) and (4), $R^5$ represents a hydrogen atom or an alkyl group, and a plurality of $R^5$ may be identical to or different from one another. Among others, $R^5$ is preferably a hydrogen atom or an alkyl group containing 1 or more and 3 or less carbon atoms, and is particularly preferably a hydrogen atom or a methyl group.

In the formulae (3) and (4), X and Y each independently represent a single bond or a linking group, wherein a plurality of X may be identical to different from one another, and a plurality of Y may be identical to different from one another.

When X is a linking group, such X can be a group such as an alkylene group, —O—, —NH$_2$—, or a carbonyl group. X is preferably a single bond, or an alkylene group containing 1 or more and 6 or less carbon atoms, and is more preferably an alkylene group containing 1 or more and 3 or less carbon atoms.

When Y is a linking group, such Y can be a group such as an alkylene group, —O—, or —C(=O)O—. Among others, preferred examples of Y include linking groups represented by the following structural formulae.

[Formula 20]

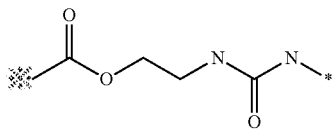

[Formula 21]

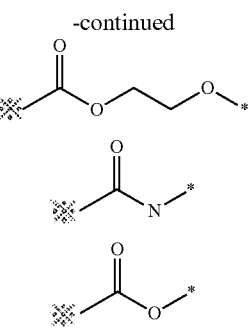

In the above structural formulae, the symbol * indicates a binding moiety with a main chain side, and the symbol ✕ indicates a binding moiety with a glucose unit or a xylose unit.

The preferred range of Z in the formulae (3) and (4) is the same as the preferred range of $L^1$ in the formulae (11) and (12).

In the formulae (3) and (4), p represents an integer of 2 or more and 1500 or less. The preferred range of p a in the formulae (3) and (4) is the same as the preferred range of n in the formulae (1) and (2).

<Polymerization Unit (b)>

The polymerization unit (b) comprises two or more units consisting of at least one type selected from an aromatic ring-containing unit, a silicon-containing unit and a metal-containing unit. The polymerization unit (b) preferably comprises two or more units consisting of at least one type selected from an aromatic ring-containing unit and a silicon-containing unit, more preferably comprises aromatic ring-containing units, even more preferably comprises benzene ring-containing units, and further preferably units derived from a structure in which a polymerizable group binds to a benzene ring. Among others, the polymerization unit (b) particularly preferably comprises a styrene-based polymer. Besides, examples of the aromatic ring-containing unit other than the styrene-based polymer include the following.

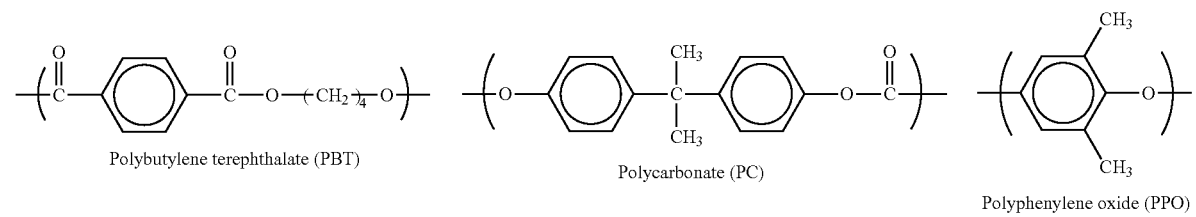

Polybutylene terephthalate (PBT)    Polycarbonate (PC)    Polyphenylene oxide (PPO)

[Formula 22]

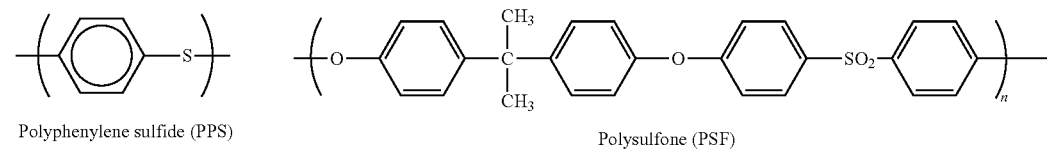

Polyphenylene sulfide (PPS)    Polysulfone (PSF)

-continued

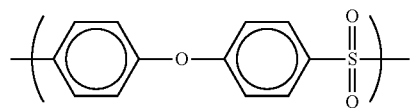
Polyethersulfone (PES)

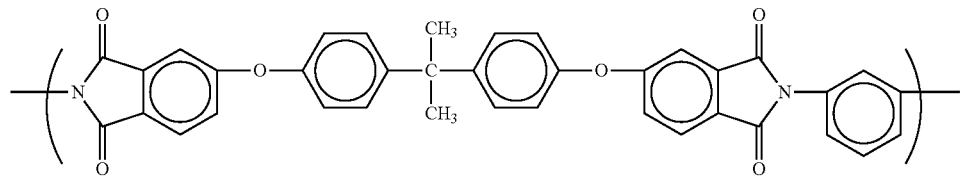
Polyetherimide (PEI)

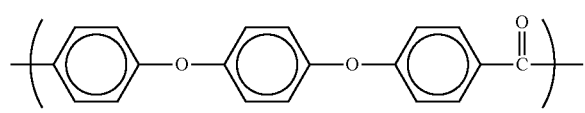
Polyetheretherketone (PEEK)

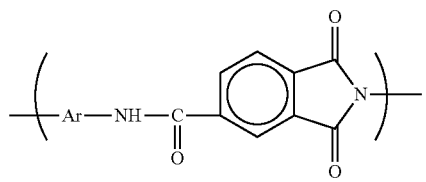
Polyamide-imide (PAI)

[Formula 23]

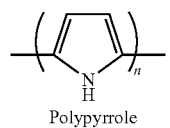
Polypyrrole

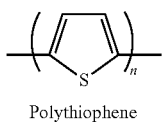
Polythiophene

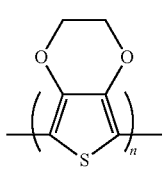
Poly
(ethylenedioxythiophene)

[Formula 24]

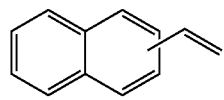
Vinylnaphthalene

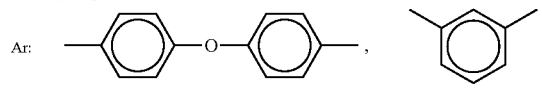
Ar:

The styrene-based polymer is a polymer obtained by polymerizing a monomeric compound comprising a styrene compound. Examples of the styrene compound include styrene, o-methylstyrene, p-methylstyrene, ethylstyrene, p-methoxystyrene, p-phenylstyrene, 2,4-dimethylstyrene, p-n-octylstyrene, p-n-decylstyrene, p-n-dodecylstyrene, chlorostyrene, bromostyrene, trimethylsilylstyrene, hydroxystyrene, 3,4,5-methoxystyrene, pentamethyldisilylstyrene, 4-butylstyrene, 4-(1,1,2,2-tetramethylpropyl)styrene, and 4-pentamethyldisilylstyrene. Among others, the styrene compound is preferably at least one selected from styrene and trimethylsilylstyrene, and more preferably styrene. That is to say, the styrene-based polymer is preferably at least one selected from polystyrene and polytrimethylsilylstyrene, and as more preferably polystyrene.

The silicon-containing unit is preferably a silicone-containing unit. Examples of the silicone include methyl silicone, methylpropyl silicone, methylhexyl silicone, methyldodecyl silicone, methylcyclohexyl silicone, dihexyl silicone, and methylphenyl silicone, and diphenyl silicone.

The metal-containing unit is preferably a metal complex. Examples of the metal complex include iron complexes such as ferrocene, ruthenium complexes such as ruthenocene, and azo metal complexes. In addition, examples of the metal-containing unit include units represented by the following structural formulae.

[Formula 25]

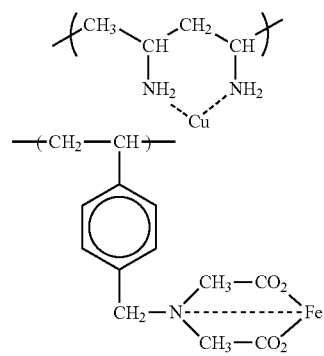

-continued

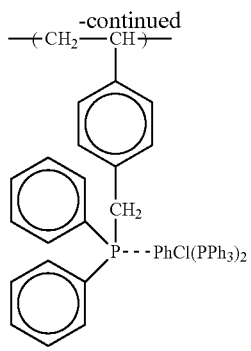

The average polymerization degree of the aromatic ring-containing unit constituting the polymerization unit is preferably 2 or more, more preferably 3 or more, and further preferably 4 or more. On the other hand, the average polymerization degree of the aromatic ring-containing unit is preferably 3000 or less, more preferably 2000 or less, and further preferably 1500 or less.

The average polymerization degree is preferably measured by gel permeation chromatography. Examples of other methods of measuring the average polymerization degree include size exclusion chromatography, a light scattering method, a viscosity method, an end-group analysis method, and a sedimentation velocity method.

(Organic Solvent)

Preferably, the self-assembly composition for pattern formation of the present invention further comprises an organic solvent. Examples of the organic solvent include an alcohol-based solvent, an ether-based solvent, a ketone-based solvent, a sulfur-based solvent, an amide-based solvent, an ester-based solvent, and a hydrocarbon-based solvent. These solvents may be used alone or in combination of two or more types.

Examples of the alcohol-based solvent include: methanol, ethanol, n-propanol, i-propanol, n-butanol, i-butanol sec-butanol tert-butanol, n-pentanol, i-pentanol, 2-methylbutanol, sec-pentanol, tert-pentanol, 3-methoxybutanol, n-hexanol, 2-methylpentanol, sec-hexanol, 2-ethylbutanol, sec-heptanol, 3-heptanol, n-octanol, 2-ethylhexanol, sec-octanol, n-nonyl alcohol, 2,6-dimethyl-4-heptanol, n-decanol, sec-undecyl alcohol, trimethylnonyl alcohol, sec-tetradecyl alcohol, sec-heptadecyl alcohol, furfuryl alcohol, phenol, cyclohexanol, methylcyclohexanol, 3,3,5-trimethylcyclohexanol, benzyl alcohol, and diacetone alcohol; and ethylene glycol, 1,2-propylene glycol, 1,3-butylene glycol, 2,4-pentanediol, 2-methyl-2,4-pentanediol, 2,5-hexanediol, 2,4-heptanediol, 2-ethyl-1,3-hexanediol, diethylene glycol, dipropylene glycol, triethylene glycol, tripropylene glycol, 1H,1H-trifluoroethanol, 1H,1H-pentafluoropropanol, and 6-(perfluoroethyl)hexanol.

Moreover, examples of a partially etherified polyhydric alcohol-based solvent include ethylene glycol monomethyl ether, ethylene glycol monoethyl ether, ethylene glycol monopropyl ether, ethylene glycol monobutyl ether, ethylene glycol monohexyl ether, ethylene glycol monophenyl ether, ethylene glycol mono-2-ethylbutyl ether, diethylene glycol monomethyl ether, diethylene glycol monoethyl ether, diethylene glycol monopropyl ether, diethylene glycol monobutyl ether, diethylene glycol monohexyl ether, diethylene glycol dimethyl ether, diethylene glycol ethylmethyl ether, propylene glycol monomethyl ether (PGME), propylene glycol monoethyl ether, propylene glycol monopropyl ether, propylene glycol monobutyl ether, dipropylene glycol monomethyl ether, dipropylene glycol monoethyl ether, and dipropylene glycol monopropyl ether.

Examples of the ether-based solvent include diethyl ether, dipropyl ether, dibutyl ether, diphenyl ether, and tetrahydrofuran (THF).

Examples of the ketone-based solvent include acetone, methylethyl ketone, methyl-n-propyl ketone, methyl-n-butyl ketone, diethyl ketone, methyl-i-butyl ketone, methyl-n-pentyl ketone, ethyl-n-butyl ketone, methyl-n-hexyl ketone, di-i-butyl ketone, trimethylnonanone, cyclopentanone, cyclohexanone, cycloheptanone, cyclooctanone, methylcyclohexanone, 2,4-pentanedione, acetonylacetone, and acetophenone.

The sulfur-based solvent is, for example, dimethyl sulfoxide.

Examples of the amide-based solvent include N,N'-dimethylimidazolidinone, N-methylformamide, N,N-dimethylformamide, N,N-diethylformamide, acetamide, N-methylacetamide, N,N-dimethylacetamide, N-methylpropionamide, and N-methylpyrrolidone.

Examples of the ester-based solvent include diethyl carbonate, propylene carbonate, methyl, acetate, ethyl acetate, γ-butyrolactone, γ-valerolactone, n-propyl acetate, i-propyl acetate, n-butyl acetate, i-butyl acetate, sec-butyl acetate, n-pentyl acetate, sec-pentyl acetate, 3-methoxybutyl acetate, methylpentyl acetate, 2-ethylbutyl acetate, 2-ethylhexyl acetate, benzyl acetate, cyclohexyl acetate, methylcyclohexyl acetate, n-nonyl acetate, methyl acetoacetate, ethyl acetoacetate, ethylene glycol monomethyl ether acetate, ethylene glycol monoethyl ether acetate, diethylene glycol monomethyl ether acetate, diethylene glycol monoethyl ether acetate, diethylene glycol mono-n-butyl ether acetate, propylene glycol monomethyl ether acetate (PGMEA), propylene glycol monoethyl ether acetate, propylene glycol monopropyl ether acetate, propylene glycol monobutyl ether acetate, dipropylene glycol monomethyl ether acetate, dipropylene glycol monoethyl ether acetate, glycol diacetate, methoxytriglycol acetate, ethyl propionate, n-butyl propionate, i-amyl propionate, methyl 3-methoxypropionate, diethyl oxalate, di-n-butyl oxalate, methyl lactate, ethyl lactate, n-butyl lactate, n-amyl lactate, diethyl malonate, dimethyl phthalate, and diethyl phthalate.

Examples of the hydrocarbon-based solvent include: aliphatic hydrocarbon-based solvents such as n-pentane, i-pentane, n-hexane, i-hexane, n-heptane, i-heptane, 2,2,4-trimethylpentane, n-octane, i-octane, cyclohexane, or methylcyclohexane; and aromatic hydrocarbon-based solvents such as benzene, toluene, xylene, mesitylene, ethyl benzene, trimethyl benzene, methylethyl benzene, n-propyl benzene, i-propyl benzene, diethyl benzene, i-butyl benzene, triethyl benzene, di-i-propyl benzene, n-amyl naphthalene, or anisole.

Among these examples, propylene glycol monomethyl ether acetate (PGMEA), propylene glycol monomethyl ether (PGME), anisole, ethanol, methanol, acetone, methylethyl ketone, hexane, tetrahydrofuran (THF), dimethyl sulfoxide (DMSO), 1H,1H-trifluoroethanol, 1H,1H-pentafluoropropanol, 6-(perfluoroethyl)hexanol, ethyl acetate, propyl acetate, butyl acetate, and cyclohexanone are more preferable, and PGMEA is further preferable. These solvents may be used alone or in combination of two or more types.

The content of such an organic solvent is preferably 10% by mass or more, more preferably 20% by mass or more, and further preferably 30% by mass or more, based on the total mass of the self-assembly composition for pattern formation. On the other hand, the content of such an organic solvent is preferably 99.9% by mass or less, more preferably 99% by mass or less, and further preferably 98% by mass or less, based on the total mass of the self-assembly composition for pattern formation. By setting the content of the organic solvent within the above-described range, the coating properties of the self-assembly composition can be improved upon formation of a pattern.

(Ionic Liquid)

Preferably, the self-assembly composition for pattern formation of the present invention further comprises an ionic liquid. The ionic liquid means a solvent, which is in the state of liquid at a temperature of 100° C. or lower and is composed of only ions. With regard to ions constituting such an ionic liquid, at least one of a cationic part and an anionic part is composed of organic ions.

By allowing the self-assembly composition for pattern formation to comprise an ionic liquid, compatibility between the block copolymer and the organic solvent can be enhanced. Moreover, the ionic liquid also has a function of promoting the phase separation of the block copolymer.

The ionic liquid consists of a cationic part and an anionic part. The cationic part of the ionic liquid is not particularly limited, and in general, those used in the cationic part of an ionic liquid can be used herein. Preferred examples of the cationic part of the ionic liquid include a nitrogen-containing aromatic ion, an ammonium ion, and a phosphonium ion.

Examples of the nitrogen-containing aromatic cation include a pyridinium ion, a pyridazinium ion, a pyrimidinium ion, a pyrazinium ion, an imidazolium ion, a pyrazonium ion, an oxazolium ion, a 1,2,3-triazolium ion, a 1,2,4-triazolium ion, a thiazolium ion, a piperidinium ion, and a pyrrolidinium ion.

Examples of the anionic part of the ion liquid include a halogen ion, a carboxylate ion, a phosphinate ion, a phosphate ion, a phosphonate ion, and a bis(trifluoromethylsulfonyl)imide ion. Examples of the halogen ion include a chloride ion, a bromide ion, and an iodide ion, and among these, a chloride ion is preferable. Examples of the carboxylate ion include a formate ion, an acetate ion, a propionate ion, a butyrate ion, a hexanoate ion, a maleate ion, a fumarate ion, an oxalate ion, a lactate ion, and a pyruvate ion, and among these, a formate ion, an acetate ion, and a propionate ion are preferable.

The content of the ionic liquid is preferably 1% by mass or more, more preferably 2% by mass or more, and further preferably 3% by mass or more, based on the total mass of the self-assembly composition for pattern formation. On the other hand, the content of the ionic liquid is preferably 99% by mass or less, more preferably 98% by mass or less, and further preferably 97% by mass or less, based on the total mass of the self-assembly composition for pattern formation. By setting the content of the ionic liquid within the above-described range, compatibility between the block copolymer and the organic solvent can be enhanced. Moreover, by setting the content of the ionic liquid within the above-described range, the phase separation of the block copolymer can be promoted.

(Optional Components)

The self-assembly composition for pattern formation of the present invention may further comprise optional components. The optional component is, for example, a surfactant. By allowing the self-assembly composition for pattern formation to comprise a surfactant, the coating properties of the self-assembly composition on a substrate or the like upon pattern formation can be improved. Examples of a preferred surfactant include a nonionic surfactant, a fluorine-bused surfactant, and a silicone-based surfactant. These surfactants may be used alone or in combination of two or more types.

The self-assembly composition for pattern formation of the present invention may comprise monomeric components of the block copolymer. For example, in order to improve desired phase separation properties, a monomer constituting the polymerization unit (a) or a monomer constituting the polymerization unit (b) can be added, as appropriate, to the present self-assembly composition for pattern formation.

(Method for Producing Self-Assembly Composition for Pattern Formation)

<Method of Extracting Polymerization Unit (a)>

The polymerization unit (a) comprising two or more units consisting of at least one type selected from a glucose unit and a xylose unit may be synthesized, but it is preferably extracted from lignocellulose or the like derived from woody plants or herbaceous plants. When the polymerization unit (a) is extracted from lignocellulose or the like derived from woody plants or herbaceous plants, the extraction method described in JP-A-2012-100546, etc. can be applied.

<Extraction of Xylooligosaccharide>

As a woody plant-derived lignocellulose raw material, the xylem or bark of broadleaf trees or coniferous trees is preferably used, but other sites such as a branch or a leaf can also be used. As a herbaceous plant-derived lignocellulose raw material, the sites of kenaf, hemp, bagasse, rice, etc., such as a stem or a leaf, can be used without any particular limitation. Upon extraction of the polymerization unit (a), it is preferable to use a fibrillated product obtained by performing a fibrillation treatment on the sites of woody plants, such as a xylem or a bark, or the sites of herbaceous plants, such as a stem, a branch or a leaf. After completion of the fibrillation treatment, the obtained product is preferably used in the form of pulp. The pulp used herein is not particularly limited, and examples thereof include chemical pulp, mechanical pulp, and deinked pulp. A broadleaf tree-derived chemical pulp is preferable. Examples of a digestion method for obtaining chemical pulp include known digestion methods such as craft digestion, polysulfide digestion, soda digestion, or alkali sulfite digestion. Taking into consideration the quality of pulp, the energy efficiency for obtaining pulp, etc., it is preferable to use the craft digestion method. In addition, it is more preferable to use pulp that is bleached with oxygen after completion of the craft digestion.

When the polymerization unit (a) is extracted from lignocellulose or the like derived from woody plants or herbaceous plants, pulp slurry is preferably subjected to an enzyme treatment, a reverse osmosis membrane treatment, an ultrafiltration treatment, or an acid treatment, and is more preferably, further subjected to an activated carbon treatment and an ion exchange treatment.

In the enzyme treatment step, a hemicellulase treatment is preferably carried out. The hemicellulase used in the present invention is not particularly limited, as long as it comprises xylanase activity. Examples of the hemicellulase include; commercially available enzyme preparations, such as, as product names, Cartazyme (manufactured by Clariant), Pulpzyme (manufactured by Novo Nordisk), Ecopulp (manufactured by Rohm Enzyme, Inc.), Sumizyme (manufactured by Shin-Nippon Chemical Industrial Co., Ltd.), Multifect Xylanase (manufactured by Genoncor Inc.), or Xylanase Conch (manufactured by Advanced Bio-Chemicals Co., Ltd.); and xylanase produced by microorganisms such as genus *Trichoderma*, genus *Thermomyces*, genus *Aureobasidium*, genus *Streptomyces*, genus *Aspergillus*, genus *Clostridium*, genus *Bacillus*, genus *Thermotoga*, genus *Thermoascus*, genus *Caldocellum*, or genus *Thermomonospora*.

In the hemicellulase treatment step, by adjusting the amount of hemicellulase added to pulp and the reaction time, the concentration of oligosaccharide eluted from the pulp and the polymerization degree of oligosaccharide can be controlled. In general, as the added amount of hemicellulase increases, or as the reaction time prolongs, the concentration of oligosaccharide in the reaction solution increases and the polymerization degree of oligosaccharide decreases. Accordingly, in order to stably obtain a high concentration of molasses containing a high polymerization degree of oligosaccharide, it is preferable that a suitable amount of hemicellulase (i.e., hemicellulase in which low-molecular-weight hemicellulase is not decomposed) be added to pulp, and that an aliquot of the molasses after completion of the reaction be returned to an enzyme reaction tank and be subjected to an enzyme reaction again. Thereby, while maintaining a high polymerization degree of oligosaccharide, the sugar concentration in the high polymerization degree of oligosaccharide can be enhanced as the time lapses.

Besides, the suitable amount of hemicellulase added to pulp and the reaction time are different depending on the type of the used enzyme. For example, in the case of multifect xlanase, the reaction time is preferable 10 minutes or longer and 240 minutes or shorter. In addition, the amount of hemicellulase added to pulp is preferably 2 units/g or more and 200 unit/g or less, based on the absolute dry mass of the pulp.

The polymerization degree of oligosaccharide, which is eluted in the reaction solution obtained by subjecting pulp to a hemicellulase treatment, is fluctuated depending on the type of the used enzyme or reaction conditions. For example, in the case of using multifect xylanase, under conditions of a pulp concentration of 10% by mass, a reaction time of 45 minutes, a reaction temperature of 50° C., pH 6.0, and the amount of enzyme added to pulp that is 50 units/g, xylooligosaccharide having a polymerization degree of 1 or more and 15 or less and an average polymerization degree of approximately 5, and acidic xylooligosaccharide having a polymerization degree of 1 or more and 20-mer or less and an average polymerization degree of approximately 10 are eluted in molasses.

With regard to the reverse osmosis membrane treatment step, a sugar solution contained in the filtrate obtained after the reaction of pulp with hemicellulase is concentrated. In a method using a reverse osmosis membrane, low molecules such as xylose or xylobiose (sugar having a small polymerization degree) or low-molecular-weight substances contained in the molasses obtained after completion of the reaction (e.g., inorganic matters such as sodium carbonate or sodium thiosulfate, organic acids, etc.) are removed as permeates, and only high-molecular-weight substances (xylooligosaccharide having a high polymerization degree) are selectively concentrated.

An ultrafiltration membrane treatment is preferably performed on molasses that has been concentrated using a reverse osmosis membrane. In the treatment using an ultrafiltration membrane, high-molecular-weight impurities, such as raw material-derived lignin originally contained in the sugar concentrate or coloring substances, can be removed. The cutoff molecular weight of the ultrafiltration membrane is preferably 5000 or more and 30000 or less.

The molasses concentrated using a reverse osmosis membrane comprises xylooligosaccharide and acidic xylooligosaccharide. Some portions of the xylooligosaccharide and the acidic xylooligosaccharide bind to lignin and are present in the form of complexes (i.e., a lignin-xylooligosaccharide complex and a lignin-acidic xylooligosaccharide complex). Thus, an acid treatment is performed on the molasses that has been concentrated using a reverse osmosis membrane, so that xylooligosaccharide and acidic xylooligosaccharide can be released from the complexes. The acid treatment method is, for example, a method comprising adding acid to molasses to adjust pH to 5 or less, and then heating the molasses at a high temperature. The acid used in the adjustment of pH is not particularly limited, and examples of the acid include mineral acids such as sulfuric acid and hydrochloric acid, and organic acids such as oxalic acid and acetic acid. The pH applied dating the acid treatment is preferably 2 or more and 5 or less. The temperature applied during the acid treatment is not particularly limited, and it is preferably 100° C. or higher and 200° C. or lower. In addition, the pressure applied during the acid treatment is preferably in the range of the atmospheric pressure or more and 5 kg/cm$^2$ or less.

In order to further reduce the content of impurities contained in the molasses after completion of the acid treatment, such as coloring substances, an activated carbon treatment is preferably carried out. The type of the activated carbon used is not particularly limited, as long as it has an ability to reduce the content of impurities contained in the molasses, such as coloring substances.

In the ion exchange treatment step, xylooligosaccharide and acidic xylooligosaccharide contained in molasses, from which impurities such as coloring substances have been reduced, are separated and/or purified using an ion exchange resin. The separation and/or purification method that can be applied herein is, for example, a method of passing a sugar concentrate containing oligosaccharide through (1) a strong cation resin, (2) a weak anion resin, (3) a strong cation resin, and (4) a weak anion resin in this order. Since acidic xylooligosaccharide is adsorbed on the anionic resin in this method, only xylooligosaccharide can be recovered as a filtrate. Subsequently, a salt solution such as sodium chloride is passed through the anion resin, so that acidic xylooligosaccharide can be eluted from the resin and can be recovered. The recovered solution containing xylooligosaccharide and acidic xylooligosaccharide can be concentrated, for example, using a concentration apparatus such as Evaporation. The solution containing oligosaccharide is dried by spray drying to obtain the powders of xylooligosaccharide and acidic xylooligosaccharide.

Xylan can be extracted by applying, for example, the method disclosed in JP-A-2012-180424.

Cellulose can be extracted by applying, for example, the method disclosed in JP-A-2014-148629.

Xylan, xylose, xylooligosaccharide and the like, which have been extracted by the above-described methods, are allowed to react with organic acid or hydrogen halide, so that the hydrogen represented by $R^1$ in the formula (1) and the formula (2) can be converted to a desired substituent. For instance, the extracted xylan, xylose, xylooligosaccharide and the like are treated with acetic acid, so that the hydrogen represented by $R^1$ in the formula (1) and the formula (2) can be converted to an acetyl group.

<Method of Synthesizing Polymerization Unit (b)>

The polymerization unit (b) may be formed by synthesis, or a commercially available product may be used as such a polymerization unit (b). In the case of polymerizing the polymerization unit (b), a known synthetic method can be adopted. On the other hand, in the case of using a commercially available product, Amino-terminated PS (Mw=12300 Da, Mw/Mn=1.02, manufactured by Polymer Source, Inc.), etc. can be used, for example.

<Coupling Reaction>

The block copolymer can be synthesized with reference to Macromolecules Vol. 36, No. 6, 2003. Specifically, a compound comprising two or more units consisting of at least one type selected from a glucose unit and a xylose unit (polymerization unit (a)) and a compound comprising at least two or more aromatic ring-containing units (polymerization unit (b)) are added to a solvent such as DMF, water or acetonitrile, and a reducing agent is then added thereto. The reducing agent can be $NaCNBH_3$ or the like. Thereafter, the mixture is stirred at a temperature of 30° C. or higher and 100° C. or lower for 1 or more and or less days, and a reducing agent is appropriately added to the reaction mixture, as necessary. Water is added to the reaction mixture to obtain a precipitate, and a solid content thereof is then vacuum-dried, so that a block copolymer can be obtained.

Examples of the method of synthesizing a block copolymer include synthetic methods using radical polymerization, RAFT polymerization, ATRP polymerization, click reaction, NMP polymerization, or living anion polymerization, as well as the above-described method.

The RAFT polymerization is a radical initiation polymerization reaction involving an exchange chain reaction of utilizing a thiocarbonylthio group. For instance, there can be adopted a method comprising converting the OH group attached to position 1 at the terminus of xylooligosaccharide to a thiocarbonylthio group, and then allowing a styrene monomer to react with the resultant at a temperature of 30° C. or higher and 100° C. or lower to synthesize a block copolymer (Material Matters, Vol. 5, No. 1, *Saishin Kobunshi Gosei* (Latest Polymer Synthesis), Sigma-Aldrich Japan).

In the ATRP polymerization, the OH group at the terminus of sugar is halogenated, and thereafter, a metal complex [(CuCl, $CuCl_2$, CuBr, $CuBr_2$, CuI, etc.)+TPMA (tris(2-pyridylmethyl)amine)], MeTREN (tris[2-(dimethylamino) ethyl]amine), etc.), a monomer (e.g., a styrene monomer), and a polymerization initiator (2,2,5-trimethyl-3-(1-phenylethoxy)-4-phenyl-3-azahexane) are allowed to react with the sugar, so that a sugar block copolymer, (e.g., a sugar-styrene block copolymer) can be synthesized.

The living anion polymerization is a method of carrying out a polymerization reaction by allowing a polymerization initiator such as n-BuLi to react with a monomer. For instance, xylooligosaccharide, position β-1 at the terminus of which is halogenated, is allowed to react with a polymerization initiator, and thereafter, the resultant is then allowed to react with a styrene monomer, so that a xylooligosaccharide-styrene block copolymer can be synthesized.

The click reaction is a 1,3-dipolar azide/alkyne cycloaddition reaction of using sugar having a propargyl group and a Cu catalyst. The polymerization unit (a) and the polymerization unit (b) have a linking group comprising the following structure between them.

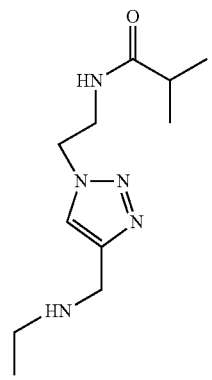

[Formula 26]

(Pattern Forming Method)

The present invention relates to a pattern forming method, comprising a step of applying the aforementioned self-assembly composition for pattern formation onto a substrate and forming a self-assembly film according to self-assembly phase separation, and an etching step. The step of forming a self-assembly film according to self-assembly phase separation is a step of forming a self-assembly film having a phase-separated structure, using a self-assembly composition for pattern formation (hereinafter also referred to as a "step (1)"). The etching step is a step of removing a partial phase of the self-assembly film (hereinafter also referred to as a "step (2)").

Besides, the pattern-forming step may further comprise a step of forming a guide pattern on the substrate before forming the pattern. The step of forming a guide pattern may comprise a step of forming a under layer and a step of forming a pre-pattern on the under layer.

FIG. 1(*a*) to FIG. 4(*d*) are schematic views showing the pattern-forming step. FIGS. 1(*a*)-1(*c*) show a pattern forming method in a case where a guide pattern is formed on a substrate 70. When the pattern-forming step includes a step of forming a guide pattern, as shown in FIG. 1(*a*), a guide hole 50 having a hole part 55 may be formed as a guide pattern on the substrate 70. The hole part 55 in the guide hole 50 is filled with a self-assembly composition for pattern formation 1 comprising a block copolymer 10.

FIGS. 2(*a*)-2(*c*) show a pattern forming method in a case where a linear, uneven shaped guide pattern 60 is formed on a substrate 70. In FIG. 2(*a*), a space (groove) between the guide patterns 60 is filled with a self-assembly composition for pattern formation 1 comprising a block copolymer 10.

FIGS. 3(*a*)-3(*d*) show a pattern forming method in a case where a post guide 62 is formed as a guide pattern on a substrate 70. In FIG. 3(*a*), a self-assembly composition for pattern formation 1 comprising a block copolymer 10 is filled to a substrate 70, such that the post guide 62 is embedded into the self-assembly composition.

FIGS. 4(*a*)-4(*d*) show a pattern forming method in a case where a guide hole 50 is formed as a guide pattern on a substrate 70. In FIGS. 4(*a*)-4(*d*), a hole part 55 in a guide hole 50 is filled with a self-assembly composition for pattern formation 1 comprising a block copolymer 10. Besides, a difference between FIGS. 1(*a*)-1(*c*) and FIGS. 4(*a*)-4(*d*) is that one phase P and one phase Q are formed in the hole part 55 in FIGS. 1(*a*)-1(*c*), whereas a plurality of phases Q are formed in FIGS. 4(*a*)-4(*d*). FIGS. 4(*a*)-4(*d*) show a pattern forming method in a case where the diameter of the guide hole 50 is longer than the molecular length of the block copolymer 10. In FIGS. 4(a)-4(d), the number of phases Q formed in the hole part 55 is preferably 2 or more and 500 or less, more preferably 2 or more and 50 or less, and further preferably 1 or more and 7 or less. By setting the number of phases Q formed in the hole part 55 within the above-described range, a pattern is easily formed to have a desired shape.

Figure 1B:
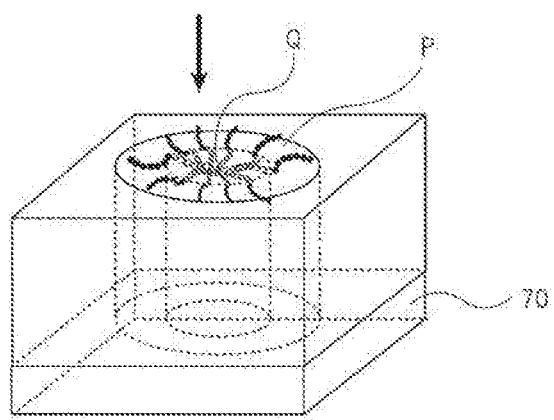
Figure 1C:
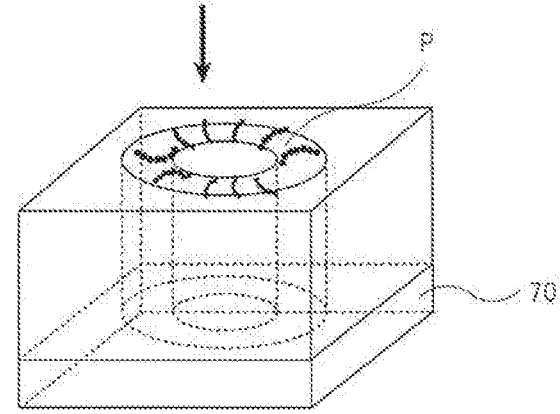
Figure 2A:
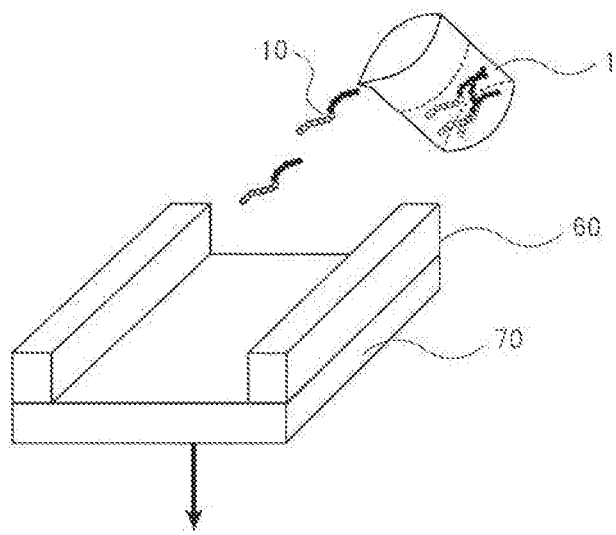
FIGS. 2(*a*)-2(*c*) are schematic views showing a pattern-forming step.
Figure 2B:
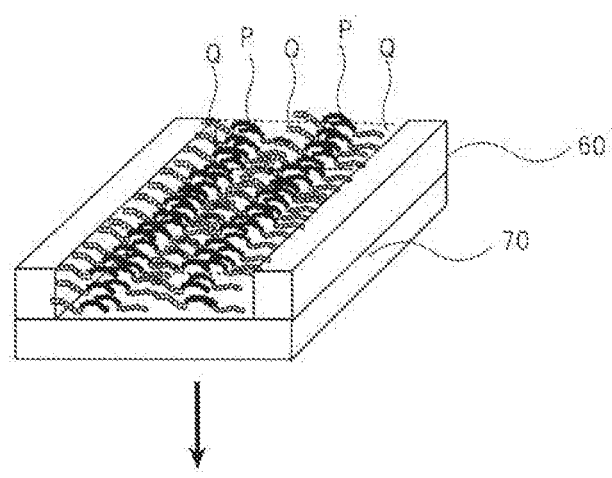
Figure 2C:
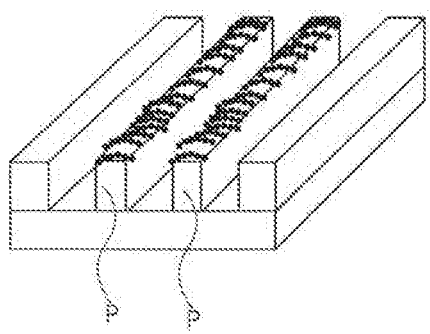

The guide pattern may have a hole shape as shown in FIGS. 1(a)-1(c), or may also have a linear, uneven shape as shown in FIGS. 2(a)-2(c). When the guide pattern has a hole shape, the preferred internal diameter is, for example, preferably 5 nm or more and 300 nm or less, and more preferably 6 nm or more and 200 nm or less. When the guide pattern has a linear, uneven shape, the width of a concave portion is preferably 5 nm or more and 300 nm or less, and more preferably 6 nm or more and 200 nm or less. The guide pattern needs to have a pattern shape that is equivalent to or greater than a pattern to be formed.

The hole shape of the guide hole may be a perfect circle or an ellipse. Otherwise, the hole shape may also be a plurality of perfect circles that are connected with one another. Based on the relationship between the molecular length (L0) of the block copolymer and the size (diameter) of the guide hole, a phase-separated shape varies in the guide hole. In the case of the hole shape as shown in FIGS. 1(a)-1(c), the diameter of the hole is preferably 1.5 to 2.5 times larger than the molecular length L0 of the block copolymer. Herein, the molecular length L0 of the block copolymer can be measured using a small-angle X-ray scattering method (SAXS). Moreover, in the case of the hole shape as shown in FIGS. 4(a)-4(d), the length of the major axis of the ellipse of the guide hole is preferably 3 to 5 times longer than the molecular length L0 of the block copolymer, and the length of the minor axis of the ellipse of the guide hole is preferably 1.5 to 2.5 times longer than the molecular length L0 of the block copolymer.

The diameter of the post guide 62 as shown in FIGS. 3(a)-3(d) is preferably 5 nm or more and 300 nm or less, and more preferably 6 nm or more and 200 nm or less. Moreover, the height of the post guide 62 is preferably 5 nm or more and 300 nm or less, and more preferably 6 nm or more and 200 nm or less.

The post guide 62 can be appropriately arranged, such that a desired phase-separated pattern structure can be obtained. The post guide 62 may be arranged, such that the arrangement pattern can be a hexagonal lattice arrangement. In the case of such a hexagonal lattice arrangement, the preferred interval between the post guides 62 is preferably 1.5 to 20 times, more preferably 1.5 to 10 times, and further preferably 1.5 to 7 times larger than the molecular length L0 of the block copolymer. As the interval between the post guides 62 decreases, a phase-separated pattern having higher positional accuracy can be obtained.

Besides, as a guide pattern forming method, a physical guide (graphoepitaxy) as described in FIGS. 1(a) to 4(d) may be used, or a chemical guide (chemoepitaxy) may also be used. As a method of forming a chemical guide, the method described in JP-B-5729537 can be applied, for example.

The material of a member for forming a guide pattern is not particularly limited. For example, inorganic materials such as Si, $SiO_2$, $Al_2O_3$, AlN, GaN or glass may be used, or commercially available resist materials may also be used.

Examples of the substrate used in the pattern forming method of the present invention include substrates such as glass, silicone, SiN, GaN or AlN. Otherwise, substrates consisting of organic materials such as PET, PE, PEO, PS, a cycloolefin polymer, polylactic acid or a cellulose nanofiber may also be used. Moreover, a plurality of layers consisting of different materials may be sandwiched between the substrate and the guide pattern-forming layer. Such materials are not particularly limited, and examples of the materials include inorganic materials such as $SiO_2$, SiN, $Al_2O_3$, AlN, GaN, GaAs, W, SOC or SOG, and organic materials such as commercially available adhesives.

When the step of forming a guide pattern includes a step of forming a under layer, as a composition for forming a under layer, a commercially available composition for forming a under layer can be used.

The method of forming a under layer is not particularly limited. The method of forming a under layer is, for example, a method comprising applying a composition for forming a under layer onto a substrate according to a known method such as spin-coating to form a coated film, and then hardening the coated film by light exposure and/or heating, so as to form a under layer. Examples of the radiation used in the light exposure include visible light, ultraviolet light, far-ultraviolet light, X-ray, electron beam, γ-ray, molecular beam, and ion beam. In addition, the temperature applied upon heating the coated film is not particularly limited, and it is preferably 90° C. or higher and 550° C. or lower. Besides, the film thickness of the under layer is not particularly limited, and it is preferably 10 nm or more and 20000 nm or less. Further, the above-described under layer may comprise a SOC (Spin on carbon) film.

When the step of forming a guide pattern includes a step of forming a under layer and a step of forming a pre-pattern on the under layer, a method similar to a known resist pattern forming method can be applied. As a composition for forming a pre-pattern, a conventional composition for forming a resist film can be used. As a specific method of forming a pre-pattern, for example, a commerically available chemically amplified resist composition is applied onto the above-described under layer to form a resist film. Subsequently, radiation is applied to a desired region of the resist film via a mask with a specific pattern, and immersion exposure, etc. is then carried out. Examples of the above-described radiation include ultraviolet light, far-ultraviolet light, X-ray, and charged particle beam. Among these, far-ultraviolet light is preferable, ArF excimer laser light and KrF excimer laser light are more preferable, and ArF excimer laser light is further preferable. Subsequently, post-exposure baking (PEB) is carried out, and development is then carried out using a developing solution such as an alkaline developing solution, so as to form a desired pre-pattern.

Moreover, the guide pattern can also be formed by applying a nanoimprint technique.

Besides, a hydrophobic treatment or a hydrophilic treatment may be performed on the surface of the above-described pre-pattern. The specific treatment method is, for example, a hydrogenation treatment, in which the surface of the pre-pattern is exposed to hydrogen plasma for a predetermined period of time. By enhancing the hydrophobicity or hydrophilicity of the surface of the pre-pattern, the self-assembling of the self-assembly composition for pattern formation can be promoted.

By allowing the pattern forming method to comprise a step of forming a under layer and a step of forming a pre-pattern on the under layer, the phase separation of a self-assembly composition for pattern formation is precisely controlled, and the obtained pattern can be further fibrillated. However, in the case of using the self-assembly composition for pattern formation of the present invention, a fine pattern, in which phase separation is precisely controlled, can be formed without forming a under layer. Furthermore, even if a guide pattern is not formed, a phase-separated structure can be formed.

<Step (1)>

The step of forming a self-assembly film according to self-assembly phase separation (step (1)) is a step of forming a self-assembly film having a phase-separated structure, using a self-assembly composition for pattern formation. In a case where the aforementioned under layer and pre-pattern are not used, the self-assembly composition for pattern formation is directly applied onto a substrate to form a coated film, so as to form a self-assembly film having a phase-separated structure. On the other hand, in a case where the aforementioned under layer and pre-pattern are used, a self-assembly composition for pattern formation is used to form a coated film in a region on the under layer sandwiched between the pre-patterns, and a self-assembly film with a phase-separated structure, which has an interface roughly vertical to the substrate, is formed on an under-layer film formed on the substrate. The present invention may relate to such a self-assembly film.

In the step (1), annealing or the like is carried out on the self-assembly composition for pattern formation that has been applied onto the substrate, so that polymers having the same properties accumulate to spontaneously form an order pattern, thereby forming a self-assembly film having a phase-separated structure such as a sea-island structure, a cylinder structure, a co-continuous structure or a lamellar structure.

The annealing method is, for example, a method of heating the self-assembly composition for pattern formation at a temperature of 80° C. or higher and 400° C. or lower, using an oven, a hot plate, etc. The annealing time is generally 10 seconds or longer and 30 minutes or shorter. The film thickness of the thus obtained self-assembly film is preferably 0.1 nm or more and 500 nm or less.

Figure 3A:
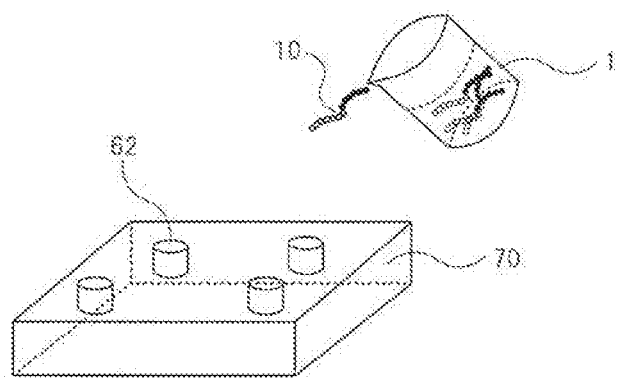
FIGS. 3(*a*)-3(*d*) are schematic views showing a pattern-forming step.
Figure 3B:
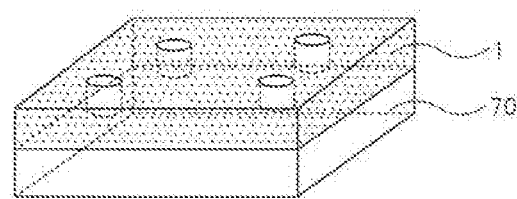
Figure 3C:
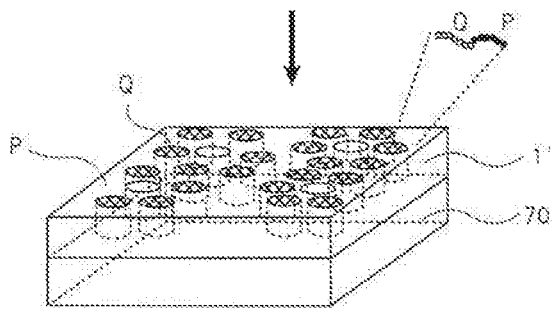
Figure 3D:
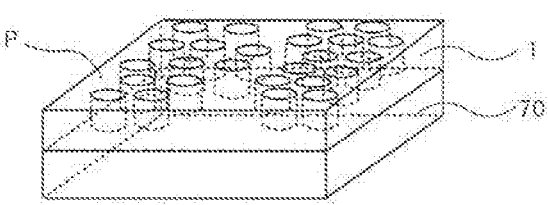
Figure 4A:
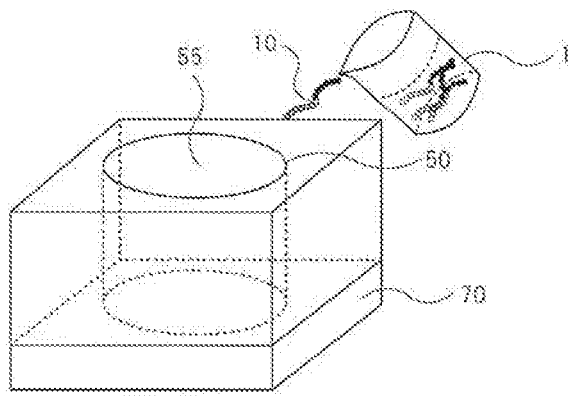
FIGS. 4(*a*)-4(*d*) are schematic views showing a pattern-forming step.
Figure 4B:
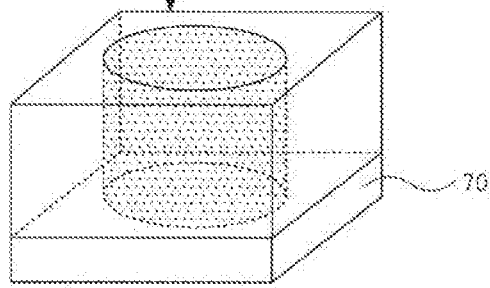
Figure 4C:
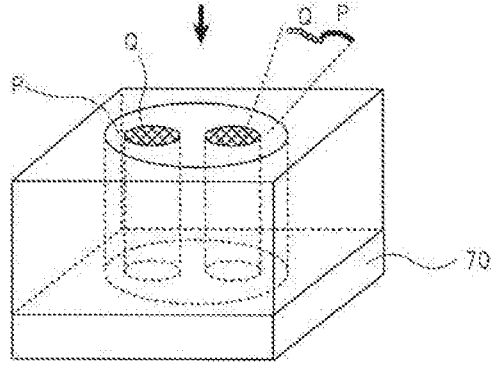
Figure 4D:
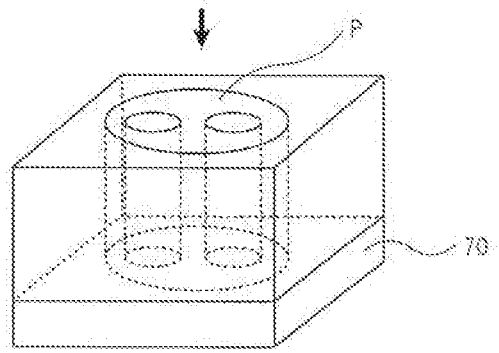

The annealing step is preferably established, in FIGS. 1(a)-1(c), when the condition shown in FIG. 1(a) is converted to the condition shown in FIG. 1(b), or in FIGS. 2(a)-2(c), when the condition shown in FIG. 2(a) is converted to the condition shown in FIG. 2(b), or in FIGS. 3(a)-3(d), when the condition shown in FIG. 3(b) is converted to the condition shown in FIG. 3(c), or in FIGS. 4(a)-4(d), when the condition shown in FIG. 4(b) is converted to the condition shown in FIG. 4(c). By phase separation of the block copolymer in the annealing step, a phase-separated structure is formed. When the pattern-forming step includes a step of forming a guide pattern, as shown in FIG. 1(b) for example, the phase is separated into the phase P on the outer peripheral side and the phase Q on the inner peripheral side. At this time, phase separation is preferably carried out, so that the block copolymer becomes a cylindrical shape. When the guide pattern has a linear, uneven shape, the separated phase P and the separated phase Q are separated from each other in layers, as shown in FIG. 2(b). At this time, phase separation is preferably carried out, so that the block copolymer becomes a lamellar shape. In FIG. 3(c), the phase is separated into the phase P on the outer peripheral side and the phase Q on the inner peripheral side, so that a hexagonal close-packed structure can be formed having the post guide 62 as a center. On the other hand, in FIG. 4(c), the phase P is separated from the phase Q, so that a plurality of the phases Q can be formed in the guide hole 50. In the present invention, the phase P is preferably composed of a polymerization unit (b) comprising at least two or more aromatic ring-containing units, and the phase Q is preferably composed of a polymerization unit (a) comprising two or more units consisting of at least one type selected from a glucose unit and a xylose unit.

The method of applying the self-assembly composition for pattern formation onto a substrate to form a coated film is not particularly limited. An example of the method of forming such a coated film is a method of applying the used self-assembly composition for pattern formation onto a substrate according to a spin-coating method. According to this method, the self-assembly composition for pattern formation is applied onto the above-described substrate, or between pre-patterns on the above-described under layer, thereby forming a coated film.

<Step (2)>

The etching step (step (2)) is a step of removing a partial phase from the self-assembly film. This removal is carried out by an etching treatment of utilizing a difference in the etching rates of individual phases that have been separated by directed self-assembling (P and Q in FIGS. 1(a) to 4(d)). FIG. 1(c), FIG. 2(c), FIG. 3(d) and FIG. 4(d) each show the state of a phase-separated structure, from which the phase Q has been removed.

Examples of the method of removing a partial phase from the self-assembly film by the etching step include known etching methods such as chemical dry etching, chemical wet etching (wet development), reactive ion etching (RIE), sputter etching, or ion beam etching. Among these etching methods, for example, a dry etching step using $O_2$ gas or the like is preferably adopted as a method of removing a phase consisting of a polymerization unit comprising two or more units consisting of at least one type selected from a glucose unit and a xylose unit. A chemical wet etching step is also preferably adopted.

The etching step may comprise a step of removing a pre-pattern. The method of removing a pre-pattern is not particularly limited. For example, a method of removing a pre-pattern by an etching treatment of utilizing a difference in the etching rates between the pre-pattern and the formed self-assembly film can be applied.

The pattern can be formed as described above. The formed pattern is preferably a line-and-space pattern or a hole pattern. According to the pattern forming method of the present invention, since the aforementioned self-assembly composition for pattern formation is used, a favorable phase-separated structure can be formed even in the case of forming a large size pattern. In addition, upon the formation of a fine pattern structure, a under layer and the like are not necessary, and a pattern can be formed in a simple process. Moreover, using the thus formed pattern as a mask, a pattern shape can be formed on a Si substrate, etc.

EXAMPLES

The characteristics of the present invention will be more specifically described in the following examples and comparative examples. The materials, used amounts, ratios, treatment contents, treatment procedures, etc. can be appropriately modified, unless they are deviated from the gist of the present invention. Accordingly, the scope of the present invention should not be restrictively interpreted by the following specific examples. It is to be noted that the additional percentage of a substance with respect to pulp indicates the mass percentage of a substance to the absolute dry mass of pulp.

(Method of Producing Xylooligosaccharide)

[Production of Oligosaccharide Concentrate]

Mixed hardwood chips (20% by mass of domestic hardwood chips and 80% by mass of eucalyptus materials) were subjected to kraft digestion, and were then subjected to delignification with oxygen to obtain pulp (raw material). The subsequent operations were continuously carried out.

Pulp and high-temperature water (60°) were added to a tank, and the concentration of the pulp (final concentration) was adjusted to 1.6% by mass (volume: 10 m³). Subsequently, concentrated sulfuric acid was added to the tank, and the obtained mixture was then stirred, so that the pH was adjusted to pH 5.5. Thereafter, the pulp was dehydrated and washed using a drum filter (φ 2000×600 SUF, manufactured by Shinryo Seisakusho K. K.).

First, hot water (50°) was added to the pulp (pulp concentration: 20% by mass) after completion of the dehydration, so that the concentration of the pulp was adjusted to 10% by mass. Thereafter, Multifect Xylanase (manufactured by Genencor Inc.) was added in an amount of 50 units (per gram of dry pulp) to the pulp, and the obtained mixture was then uniformly blended using Toranpo Screw (220×850 HC—C; Shinryo Seisakusho K. K.). The blended pulp was pressed into the inlet of a cylindrical reaction tank with a volume of 2 m³ (φ 800 mm×4000 mmH), using an intermediate concentration pump (200×RPK; Shinryo Seisakusho K. K.), and thereafter, it was continuously treated with the enzyme in the cylindrical reaction tank (reaction time: 40 minutes, temperature: 50° C.)

Pulp discharged from the outlet of the cylindrical reaction tank (i.e., enzyme-treated pulp) was dehydrated using a screw press (250×1000 SPH-EN; Shinryo Seisakusho K. K.) to result in a pulp concentration of 40% by mass, so as to obtain a filtrate after the xylanase reaction. After 60 minutes from initiation of the enzyme reaction, an aliquot of the filtrate after the xylanase reaction was returned to Toranpo Screw, and the concentration of pulp was then adjusted to 10% by mass, using the filtrate after the xylanase reaction, to which 20% by mass of the pulp that had been dehydrated with a drum filter was returned instead of hot water (50° C.). After 150 minutes from initiation of the enzyme treatment, the concentration of total sugar in the treated filtrate was increased to 0.92% by mass, and the average polymerization degree of xylooligosaccharide comprised in molasses at this time point was 4.7.

The aforementioned xylanase treatment of pulp was continuously carried out for 24 hours. After 150 minutes from initiation of the enzyme treatment, the reaction filtrate having a sugar concentration of approximately 0.90% by mass could be stably recovered. Finally, 15 m³ of a filtrate having a sugar concentration of 0.90% by mass was obtained after completion of the xylanase reaction. The obtained reaction filtrate was filtrated through a back filter (manufactured by ISP Fillers) having a micron rate of 1 μm, and was then filtrated through a ceramic filter (manufactured by Pall Corporation) having a micron rate of 0.2 μm, to obtain a clear filtrate (molasses). This filtrate was 15-fold concentrated using a reverse osmosis membrane (NTR-7450, manufactured by Nitto Denko Corp.: membrane quality: sulfonated polyether sulfone, membrane area: 6.5 m²×2 pieces) under operation conditions of a liquid temperature of 50° C. and a flow rate of 1400 L/h or more and 1800 L/h or less, so as to obtain 1 m³ of concentrated molasses having a total sugar concentration of 11% by mass.

[Purification of Oligosaccharide]

500 L of the above-concentrated molasses was treated by an ultrafiltration step. Specifically, the molasses was treated at a permeation flow rate of 350 L/h, using an ultrafiltration membrane with a fraction molecular weight of 10000 (ultrafiltration device: UF Membrane Module, manufactured by Osmonics). The filtrate that had passed through the ultrafiltration membrane (a fraction containing sugar) was adjusted to pH 3.5 with concentrated sulfuric acid, and was then treated at 121° C. for 45 minutes (acid treatment). The filtrate was cooled to 50° C., and an insoluble residue generated as a result of the acid treatment was then removed through a ceramic filter (manufactured by Pall Corporation) having a micron rate of 0.2 μm. An aliquot was collected from the molasses, and was then adjusted to a total sugar concentration of 0.2% by mass (by being diluted with distilled water). After that, the absorbance (coloration degree) at a wavelength of 350 nm was measured. The absorbance (coloration degree) of the molasses at a wavelength of 350 nm was found to be 0.22. Subsequently, 10 kg of activated carbon (PM-SX, manufactured by Mitsukura Kasei K. K.) was added to 480 L of the filtrate, and the obtained mixture was then treated at 50° C. for 2 hours to recover molasses (activated carbon treatment). The recovered molasses was supplied at SV of 1.5 to a 4-bed 4-tower type ion exchange resin consisting of (1) a strong cation resin (manufactured by Mitsubishi Chemical Corp.: PK-218, 300 L), (2) a weak anion resin (manufactured by Mitsubishi Chemical Corp.: WA30, 300 L), (3) a strong cation resin (manufactured by Mitsubishi Chemical Corp.: PK-218, 300 L), and (4) a weak anion resin (manufactured by Mitsubishi Chemical Corp.: WA30, 300 L) in this order, so as to obtain a xylooligosaccharide solution (sugar concentration: 4.3% by mass, 550 L). The obtained xylooligosaccharide solution was adjusted to pH 7 with a strong cation resin, and was then treated by a spray dryer (ODA-25 type, manufactured by OHKAWARA KAKOHKI CO., LTD.), so as to obtain 23.0 kg of xylooligosaccharide powders (average polymerization degree: 5.0).

Subsequently, a 50 mM sodium chloride aqueous solution was supplied at SV of 1.5 to the weak anion resins in the second and fourth towers, so that acidic xylooligosaccharide adsorbed on the ion exchange resin was eluted therefrom, to obtain an acidic xylooligosaccharide solution (sugar concentration: 2.8% by mass, 400 L). The obtained acidic xylooligosaccharide solution was adjusted to pH 5 with a strong cation resin, and was then concentrated to a sugar concentration of 20% by mass by EVAPOR (CEP-1; manufactured by OHKAWARA KAKOHKI CO., LTD.). Subsequently, the concentrate was treated by a spray dryer (ODA-25; manufactured by OHKAWARA KAKOHKI CO., LTD.) to obtain 11.3 kg of acidic xylooligosaccharide powders (average polymerization degree: 11.0).

<Secondary Purification of Xylooligosaccharide>

The molecular weight distribution of the above-described xylooligosaccharide powders (average polymerization degree: 5.0) was measured by GPC (D5280 LCS M-PDA; manufactured by Shimadzu Corporation), and as a result, Mw/Mn=1.93. In order to reduce this molecular weight distribution, separation and purification were carried out using a SEC (size exclusion chromatography) column. The following conditions were applied.

SEC column: Tosoh TSKgel G5000PW

Solvent: water

Detector: RI

By performing the separation and purification, xylooligosaccharide having a polymerization degree of 5.0 and Mw/Mn=1.08 could be obtained at a purity of 99.5%.

(Method of Producing Xylan)

Mixed hardwood chips (20% by mass of domestic hardwood chips and 80% by mass of eucalyptus materials) were subjected to kraft digestion, and were then subjected to delignification with oxygen to obtain pulp (raw material). 2 L of an aqueous solution containing 10% by mass of sodium hydroxide was added to 100 g of this pulp, and alkali extraction was then carried out, while stirring the mixture at 25° C. for 2 hours. Subsequently, the reaction mixture was filtrated and was then washed with water. The extract was adjusted to pH 7.0 with acetic acid, and 2 L of ethanol (purity: 99%, manufactured by Kanto Chemical Co., Inc.) was then added thereto, followed by leaving the mixture at 25° C. for 12 hours. Subsequently, the reaction mixture was centrifuged at 10,000 rpm for 10 minutes, and xylan was recovered as a precipitate. Ethanol was added again to the precipitate, and the obtained mixture was centrifuged under the same conditions as those described above, followed by washing the precipitate. This washing operation was carried out two times in total. Thereafter, distilled water was added again to the precipitate, and the obtained mixture was centrifuged under the same conditions as those described above, followed by washing the precipitate. This washing operation was carried out three times in total. After completion of the washing operation, the precipitate was freeze-dried overnight to obtain 5.0 g of powdery xylan. This xylan had a weight average molecular weight of 21300 and a molecular weight distribution Mw/Mn of 1.92.

<Secondary Purification of Xylan>

The xylan powders (Mw/Mn=1.92) were subjected to separation and purification, using a SEC column, in the same manner as that for the second purification of xylooligosaccharide. As a result, xylan having a weight average molecular weight Mw of 24951 and a molecular weight distribution Mw/Mn of 1.09 could be obtained.

(Method of Producing Grafted Xylan)

A grafted xylan derivative was synthesized with reference to JP-A-2012-180424.

(Method of Producing Cellulose)

600 g of Needle-leaf tree bleached kraft pulp (NBKP) (after refinery treatment; manufactured by Oji Paper Co., Ltd.; solid content: 25%) was added to 20 kg of water to prepare an aqueous suspension. The obtained slurry was subjected to a mechanical defibration treatment using a bead mill (NVM-2, manufactured by IMEX Corporation) (diameter of zirconia bead: 1 mm, filled amount of beads: 70%, rotation number: 2000 rpm, treatment number: 2 times). After completion of the defibration treatment, the resultant was dehydrated by filter pressing to obtain cellulose powders.

The cellulose powders (Mw/Mn=1.9) were subjected to separation and purification, using a SEC column, in the same manner as that for the second purification of xylooligosaccharide. As a result, cellulose having a weight average molecular weight of 34,000 and a molecular weight distribution Mw/Mn of 1.10 was obtained.

Besides, a commercially available raw material can also be used herein as cellulose.

(Measurement Methods)

(1) Quantification of Amount of Total Sugar

A calibration curve was prepared using D-xylose (manufactured by Wako Pure Chemical Industries, Ltd.), and the amount of total sugar was then quantified by a phenol sulfuric acid method ("*Kangento no Teiryo-Ho* (Method of Quantifying Reducing Sugar)"; Gakkai Shuppan Center).

(2) Quantification of Amount of Reducing Sugar

A calibration curve was prepared using D-xylose (manufactured by Wako Pure Chemical Industries, Ltd.), and the amount of reducing sugar was then quantified by a Somogyi-Nelson method ("*Kangento no Teiryo-Ho* (Method of Quantifying Reducing Sugar)"; Gakkai Shuppan Center).

(3) Method of Determining Average Polymerization Degree

A sample molasses was kept at 50° C., and was centrifuged at 15000 rpm for 15 minutes to remove insoluble matters. Thereafter, the amount of total sugar and the amount of reducing sugar contained in the supernatant (both relative to xylose) were measured. The amount of total sugar was divided by the amount of reducing sugar to obtain an average polymerization degree.

(4) Definition of Enzyme Titer

Birchwood xylan (manufactured by Sigma) was used as a substrate in the measurement of the activity of xylanase used as an enzyme. With regard to the definition of enzyme titer, the reducing power of reducing sugar obtained by decomposing xylan by xylanase was measured by a DNS method ("*Kangento no Teiryo-Ho* (Method of Quantifying Reducing Sugar)"; Gakkai Shuppan Center). The amount of enzyme necessary for generating reducing power corresponding to 1 mmol xylose for 1 minute was set at 1 unit.

(Polystyrene)

Amino-terminated PS (Mw=12300 Da, Mw/Mn=1.02, manufactured by Polymer Source, Inc.) having the following structure was used as polystyrene.

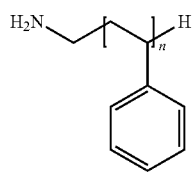

[Formula 27]

(Poly(4-Trimethylsilylstyrene))

Poly(4-trimethylsilylstyrene) (PTMSS) was synthesized in accordance with Journal of polymer science part B Polymer Physics 43, 1214 to 1219. For polymerization, an ATRP polymerization method was applied. That is, 10 g of Trimethylsilylstyrene, 520 mg of 2-(bromomethyl)-2-methylbutanoic acid, 5 mg of copper bromide, 52 mg of Me6TREN, and 20 mL of toluene were added into a round-bottom flask. The solution was degassed with argon for 10 minutes, and 50 mg of tin(II) ethyl hexanoate was then added thereto. The solution was heated to 90° C., and polymerization was carried out for 4 hours. The polymer was precipitated in methanol, and was then dried in vacuum to obtain 5.2 g of polytrimethylsilylstyrene.

(Polydimethyisilane)

As polydimethylsilane (PDMS), Poly(dimethylsiloxane) (DMS) α-sec-butyl-ω-silanol Terminated, which was manufactured by Polymer Source, Inc., was used. Polydimethylsilane (PDMS) has the following structure.

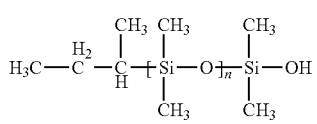

[Formula 28]

Example 1

<Coupling Reaction>

A block copolymer was synthesized with reference to Macromolecules Vol. 36, No. 6, 2003, First, 20 g of xylooligosaccharide and 400 mg of Amino-terminated PS were added into 100 mL of a mixed solvent (DMF:water=50:3), and 80 mg of NaCNBH$_3$ was also added thereto as a reducing agent. The obtained mixture was stirred at 60° C. for 7 days, and during the stirring, 80 mg of NaCNBH$_3$ was added to the reaction mixture every day. Subsequently, the mixture was cooled to room temperature, and 400 mL of water was then added thereto for precipitation. The obtained precipitate was filtrated and was then washed with cold water several times to remove excessive xylooligosaccharide. Subsequently, the filtrated solid content was subjected to vacuum drying to obtain 650 mg of a xylooligosaccharide-polystyrene block copolymer in the form of beige powders. The powders were measured by $^1$H-NMR (solvent: CDCl$_3$). As a result, a peak derived from the xylooligosaccharide was confirmed at 3.3 to 4.0 ppm, whereas a peak derived from the styrene was confirmed at 7.0 to 7.6 ppm. The composition ratio was calculated based on this integration ratio. The unit ratio between the polymerization units of xylooligosaccharide and the polymerization units of polystyrene in the block copolymer was 4:6. Moreover, as a result of GPC analysis, the weight average molecular weight (Mw) was 2000, and Mw/Mn was 1.1.

GPC column: Shodex K-806M/K-802 coupled column (manufactured by SHOWA DENKO K. K.)
Column temperature: 40° C.
Mobile phase: chloroform
Detector: RI Examples 2 to 6 and 11 to 13

As shown in Table 1, each block copolymer was obtained in the same manner as that of Example 1, with the exception that a molecular weight and a molecular structure were changed.

Examples 7 to 10 and 16

<Synthesis of Methacrylate Grafted Sugar>

10 g of Xylotriose was dissolved in 150 mL of water, and 28.5 g each of ammonium hydrogen carbonate was added to the solution every 24 hours, four times. The obtained mixture was stirred at 37° C. for 96 hours. Thereafter, 200 mL of distilled water was added to the reaction mixture, and water was distilled away to result in a volume of 20 mL. After that, 150 mL of water was added to the reaction mixture, and the mixture was then concentrated to a volume of 10 mL. These operations were carried out repeatedly, until ammonia, odor disappeared. The resultant was freeze-dried to obtain a white solid. This substance was examined by FT-IR, and as a result, an NH-derived peak was observed around 1500 cm$^{-1}$. Thus, it was confirmed that the substance could be aminated.

This substance was dissolved in 50 mL of a $1\times10^{-3}$M KOH aqueous solution, and 10.4 g of 2-isocyanate ethyl methacrylate was then added to the solution. The obtained solution was intensively stirred for 12 hours, while the temperature was kept at 3°. The precipitated white solid was removed, and the filtrate was then washed using 50 mL of diethyl ether four times, followed by performing freeze-drying. Thereafter, the obtained white solid was dissolved in a mixed solution consisting of 2 mL of water and 10 mL of methanol, and the thus obtained solution was then added dropwise to a mixed solution of 200 mL of acetone, followed by cooling. Thereafter, the reaction solution was filtrated through a filter, and was then dried under reduced pressure, to obtain 2-(methacryloyloxy)ethyl ureide xlotriose.

From the FT-IR spectrum, a peak derived from NH—CO—NH mutual stretching was found at 1570 cm$^{-1}$, a peak derived from C=O (urea) stretching vibration was found at 1650 cm$^{-1}$, and a peak derived from C=O (ester) stretching vibration was found at 1705 cm$^{-1}$. Thus, it was confirmed that methacrylate grafted sugar could be synthesized.

<Synthesis of Methacrylate Grafted Sugar-PS Block Copolymer>

Using this 2-(methacryloyloxy)ethyl ureide xylotriose 2 and styrene, a block copolymer was synthesized by ATRP polymerization.

Example 14

Propargyl grafted xylan represented by the following structural formula was synthesized with reference to Macromol. Chem. Phys, 2008, 209, 1282-1290.

For azidation of the terminus of polystyrene, 1.1 equivalents of 2-azido-1,3-dimethylimidazolinium hexafluorophosphate were added to polystyrene in a dichloromethane solvent, and then, 1.1 equivalents of DMAP and polystyrene were stirred at 50° C. for 5 hours.

The thus terminal-azidated polystyrene (1 equivalent) was dissolved in DMF. Propargyl grafted xylan (1.3 equivalents) and PMDETA (N,N,N',N'',N''-pentamethyldiethylenetriamine) (1.5 equivalents) were dissolved in DMF in another flask. The thus obtained two solutions were degassed for 15 minutes, and thereafter, both the azidated polystyrene solution and the propargyl grafted xylan solution were added into another flask in which 1.5 equivalents of copper bromide had been added. The obtained mixture was stirred at 40° C. for 72 hours. Thereafter, the reaction mixture was passed through an alumina column to remove a copper complex, and the eluant was concentrated and was then precipitated in methanol, so as to obtain a grafted xylan-PS block copolymer.

[Formula 29]

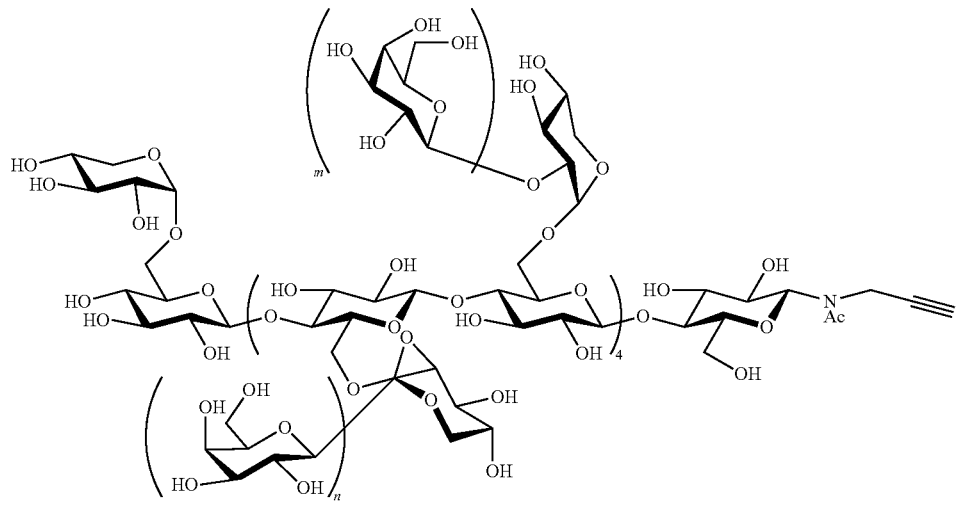

m = 0,1
n = 0,1

Example 15

10 g of Xylotriose was allowed to react with acetic anhydride and pyridine at 50° C. in 150 mL of DMAc/LiCl to obtain acetyl xylotriose. This was dissolved in acetic acid/chloroform. Thereafter, the temperature was decreased to 0° C., and hydrogen bromide was then added to the reaction mixture to obtain α-acetyl xylotriose bromide.

Hydroxystyrene and polytrimethylsilylstyrene were obtained from Polymer Source, Inc. This polymer was subjected to a coupling reaction by the same method as that of Example 1.

The α-acetyl xylotriose bromide was allowed to react with a block copolymer of hydroxystyrene-polytrimethylsilylstyrene to obtain hydroxystyrene grafted xylooligosaccharide-PTMSS, in which acetyl xylotriose was grafted onto hydroxystyrene.

Example 17

Sugar methacrylate was synthesized in the same manner as that of Example 7.

Poly(dimethylsiloxane) (DMS) α-sec.butyl-ω-silanol Terminated, manufactured by Polymer Source Inc., was used as PDMS (polydimethylsilane).

A methacrylate grafted sugar-PDMS block copolymer was synthesized by ATRP polymerization in the same manner as described above.

Comparative Example 1

PS-PMMA was synthesized, such that it had a molecular weight of 2000 and the polymerization unit ratio became 4:6. Mw/Mn was found to be 1.1.

Comparative Example 2

PS-PMMA was synthesized, such that it had a molecular weight of 50,000 and the polymerization unit ratio became 4:6. Mw/Mn was found to be 2.1.

Comparative Example 3

PS-polylactic acid was synthesized, such that it had a molecular weight of 10,000 and the polymerization unit ratio became 4:6. Mw/Mn was found to be 1.5.

(Evaluation)

<Phase Separation Size/Phase Separation Evaluation>

20 mg of the block copolymer was dissolved in 1 mL of PGMEA to obtain a self-assembly composition for pattern formation. This self-assembly composition for pattern formation was spin-coated onto a silicon wafer with a size of 2 inches. The spin-coating was carried out, so that the thickness of the film became 45 nm. This wafer was heated on a hot plate at 170° C. for 3 minutes, and the surface was then observed by SEM.

Upon the observation of the surface by SEM, if the phase-separated structure had a cylinder shape, the diameter of the circle at the cross section of the cylinder was defined as a phase separation size. The phase separation size was defined as a mean value of the maximum length (max) of a straight line passing the center point of the circle and the minimum length (min) of a straight line passing the center point of the circle. Besides, even in a case where the cross section of the cylinder did not have a circle shape, a mean value was calculated from the maximum length (max) of a straight line passing the center point of the cross section and the minimum length (min) of a straight line passing the center point of the circle.

When the phase-separated structure had a lamellar shape, the distance (width) between phases was defined as a phase separation size. When the distance between phases is measured, the width between phases remaining after etching was measured. Also in a case where the phase-separated structure had a lamellar shape, a mean value of the maximum length (max) of the width between phases and the minimum length (min) of a straight chain passing the center of the circle was defined as a phase separation size.

Subsequently, a variation in phase separation sizes was calculated according to the following expression:

Size variation=(maximum length (max)−minimum length (min))/mean value

Phase separation was evaluated based on the following criteria.

⊙: The phase separation size is 2 nm or more and 100 nm or less, and (max−min)/ave is 0.2 or less.

○: The phase separation size is 2 nm or more and 100 nm or less, and (max−min)/ave is greater than 0.2 and 0.4 or less.

x: The phase separation size is not 2 nm or more and 100 nm or less, or (max−min)/ave is greater than 0.4.

<Etching/Etching Evaluation>

Samples, which had undergone phase separation evaluation, were subjected to vapor phase etching using $O_2$ gas. After completion of the etching, the width of a concave portion was measured by SEM. The width of the concave portion after completion of the etching was referred to as a pitch width. In the case of a cylinder shape, the diameter of a circle was measured by a method similar to the method of measuring a phase separation size, whereas in the case of a lamellar shape, the width was measured by a method similar to the method of measuring a phase separation size. Etching properties were evaluated based on the following criteria.

○: In the case of a cylinder shape, the diameter of a circle can be measured, and in the case of a lamellar shape, the pitch width can be measured.

x: In the case of a cylinder shape, the diameter of a circle cannot be measured, and in the case of a lamellar shape, the pitch width cannot be measured.

TABLE 1

| | Block copolymer | Mw | Mw/Mn | Polymerization unit ratio | Heating time | Phase separation shape |
|---|---|---|---|---|---|---|
| Comp. Ex. 1 | PS-PMMA | 2,000 | 1.1 | 4:6 | 5 min | Cylinder |
| Comp. Ex. 2 | PS-PMMA | 60,000 | 2.1 | 4:6 | 24 hrs | Cylinder |
| Comp. Ex. 3 | Xylan-PLA | 10,000 | 1.5 | 4:6 | 3 min | Cylinder |
| Ex. 1 | Xylooligosaccharide-PS | 2,000 | 1.1 | 4:6 | 3 min | Cylinder |
| Ex. 2 | Xylooligosaccharide-PS | 4,000 | 1.1 | 4:6 | 3 min | Cylinder |
| Ex. 3 | Xylan-PS | 10,000 | 1.4 | 4:6 | 3 min | Cylinder |

TABLE 1-continued

| | | | | | | |
|---|---|---|---|---|---|---|
| Ex. 4 | Xylan-PS | 20,000 | 1.5 | 4:6 | 3 min | Cylinder |
| Ex. 5 | Xylan-PS | 50,000 | 1.6 | 4:6 | 3 min | Cylinder |
| Ex. 6 | Xylan-PS | 100,000 | 1.5 | 4:6 | 3 min | Cylinder |
| Ex. 7 | Methacrylate grafted sugar-PS | 2,000 | 1.1 | 4:6 | 3 min | Cylinder |
| Ex. 8 | Methacrylate grafted sugar-PS | 20,000 | 1.1 | 4:6 | 3 min | Cylinder |
| Ex. 9 | Methacrylate grafted sugar-PS | 100,000 | 1.1 | 4:6 | 3 min | Cylinder |
| Ex. 10 | PS-methacrylate grafted sugar-PS | 100,000 | 1.08 | 2:6:2 | 3 min | Cylinder |
| Ex. 11 | Cellulose-PS | 80,000 | 1.4 | 4:6 | 3 min | Cylinder |
| Ex. 12 | Xylan-PTMSS | 100,000 | 1.4 | 4:6 | 3 min | Cylinder |
| Ex. 13 | Xylooligosaccharide-PS | 2,000 | 1.1 | 1:1 | 3 min | Lamella |
| Ex. 14 | Grafted xylan-PS | 100,000 | 1.4 | 4:6 | 3 min | Cylinder |
| Ex. 15 | Hydroxystyrene grafted xylooligosaccharide-PTMSS | 100,000 | 1.1 | 4:6 | 3 min | Cylinder |
| Ex. 16 | Methacrylate grafted sugar-PS | 2,000 | 1.1 | 1:1 | 3 min | Lamella |
| Ex. 17 | Methacrylate grafted sugar-PDMS | 2,000 | 1.1 | 1:1 | 3 min | Lamella |

| | Phase separation size (xylan component) | Size variation (max-min)/ave | Phase separation evaluation | Pitch width | Etching property evaluation |
|---|---|---|---|---|---|
| Comp. Ex. 1 | — (No phase separation) | Unmeasureable | — | — (No phase separation) | (No phase separation) |
| Comp. Ex. 2 | — (No phase separation) | Unmeasureable | — | — (No phase separation) | (No phase separation) |
| Comp. Ex. 3 | −17 nm | 0.2 | ◎ | Unmeasureable | X |
| Ex. 1 | −8 nm | 0.11 | ◎ | 8 nm | ○ |
| Ex. 2 | −14 nm | 0.05 | ◎ | 14 nm | ○ |
| Ex. 3 | 18 nm | 0.2 | ◎ | 19 nm | ○ |
| Ex. 4 | 20 nm | 0.25 | ○ | 20 nm | ○ |
| Ex. 5 | 40 nm | 0.24 | ○ | 41 nm | ○ |
| Ex. 6 | 60 nm | 0.19 | ◎ | 59 nm | ○ |
| Ex. 7 | 9 nm | 0.04 | ◎ | 9 nm | ○ |
| Ex. 8 | 23 nm | 0.04 | ◎ | 24 nm | ○ |
| Ex. 9 | 60 nm | 0.05 | ◎ | 61 nm | ○ |
| Ex. 10 | 42 nm | 0.05 | ◎ | 42 nm | ○ |
| Ex. 11 | 50 nm | 0.19 | ◎ | 51 nm | ○ |
| Ex. 12 | 51 nm | 0.18 | ◎ | 60 nm | ○ |
| Ex. 13 | 8 nm | 0.04 | ◎ | 8 nm | ○ |
| Ex. 14 | 62 nm | 0.19 | ◎ | 62 nm | ○ |
| Ex. 15 | 60 nm | 0.05 | ◎ | 60 nm | ○ |
| Ex. 16 | 7 nm | 0.04 | ◎ | 7 nm | ○ |
| Ex. 17 | 7 nm | 0.03 | ◎ | 7 nm | ○ |

As is found from Table 1, in the case of using self-assembly compositions for pattern formation comprising the block copolymers obtained in the Examples, a variation in the sizes of phase-separated structures was small, and etching properties were evaluated to be good. That is to say, it was found that a favorable phase-separated structure was formed. In addition, it was also found that, in the Examples, a large pattern with a size of 30 nm or more could be formed, as well as the formation of a fine pattern with a size of 10 nm or less.

In contrast, in Comparative Examples 1 and 2, the self-assembly composition was applied onto a substrate and was then healed for 5 minutes in a phase separation experiment, and as a result, phase separation was not found by observation according to SEM. Thus, after completion of the etching, an inner space could not be obtained. In Comparative Example 3, the diameter of a circle could not be measured, and the etching properties were evaluated to be poor.

Besides, in the above Examples, xylan, xylooligosaccharide, and cellulose were used as sugar components. However, sugar components are not limited thereto. Good results tended to be obtained from a block copolymer, which comprises a polymerization unit comprising two or more units consisting of at least one type selected from a glucose unit and a xylose unit, and a polymerization unit comprising at least two aromatic ring-containing units.

REFERENCE SIGNS LIST

1 SELF-ASSEMBLY COMPOSITION FOR PATTERN FORMATION
10 BLOCK COPOLYMER
50 GUIDE HOLE
55 HOLE PART
60 GUIDE PATTERN
62 POST GUIDE
70 SUBSTRATE
P PHASE
Q PHASE

The invention claimed is:

1. A self-assembly composition for pattern formation, which comprises a block copolymer comprising a polymerization unit (a) comprising two or more units consisting of at least one type selected from a glucose unit and a xylose unit, and a polymerization unit (b) comprising two or more units consisting of at least one type selected from an aromatic ring-containing unit, a silicon-containing unit and a metal-containing unit, wherein the polymerization unit (a) has a structure represented by the following formula (1) or the following formula (3):

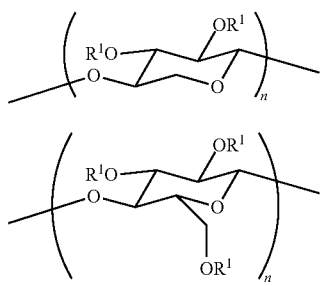

Formula (1)

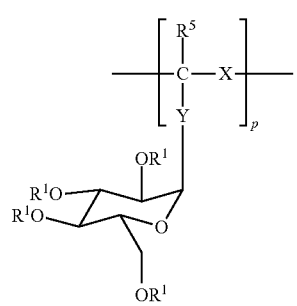

Formula (4)

Formula (2)

in Formula (1), each $R^1$ independently represents a fluorine atom, a bromine atom, a chlorine atom, an iodine atom, an alkyl group, an acyl group, an aryl group or a phosphoryl group, and a plurality of $R^1$ may be identical to or different from one another; and n represents an integer of 2 or more and 1500 or less, in Formula (3), each $R^1$ independently represents a fluorine atom, a bromine atom, a chlorine atom, an iodine atom, an alkyl group, an acyl group, an aryl group or a phosphoryl group, and a plurality of $R^1$ may be identical to or different from one another; $R^5$ represents a hydrogen atom or an alkyl group, and a plurality of $R^5$ may be identical to or different from one another; X and Y each independently represents a single bond or a linking group, wherein a plurality of X may be identical to or different from one another, and a plurality of Y may be identical to or different from one another; and p represents an integer of 2 or more and 1500 or less.

2. The self-assembly composition for pattern formation according to claim 1, wherein the polymerization unit (a) further has a structure represented by the following formula (2):

wherein $R^1$ each independently represents a hydrogen atom, a fluorine atom, a bromine atom, a chlorine atom, an iodine atom, an alkyl group, an acyl group, an aryl group or a phosphoryl group, and a plurality of $R^1$ may be identical to or different from one another; and n represents an integer of 2 or more and 1500 or less.

3. The self-assembly composition for pattern formation according to claim 1, wherein the polymerization unit (a) is a xylan derivative or a xylooligosaccharide.

4. The self-assembly composition for pattern formation according to claim 1, wherein the polymerization unit (a) further has a structure represented by the following formula (4):

wherein $R^1$ each independently represents a hydrogen atom, a fluorine atom, a bromine atom, a chlorine atom, an iodine atom, an alkyl group, an acyl group, an aryl group or a phosphoryl group, and a plurality of $R^1$ may be identical to or different from one another; $R^5$ represents a hydrogen atom or an alkyl group, and a plurality of $R^5$ may be identical to or different from one another; X and Y each independently represent a single bond or a linking group, wherein a plurality of X may be identical to or different from one another, and a plurality of Y may be identical to different from one another; and p represents an integer of 2 or more and 1500 or less.

5. The self-assembly composition for pattern formation according to claim 1, wherein the polymerization unit (b) comprises the aromatic ring-containing units.

6. The self-assembly composition for pattern formation according to claim 1, wherein the polymerization unit (b) comprises benzene ring-containing units.

7. The self-assembly composition for pattern formation according to claim 1, wherein the polymerization unit (b) comprises a styrene-based polymer.

8. The self-assembly composition for pattern formation according to claim 1, wherein the block copolymer is represented by the following formula (11)

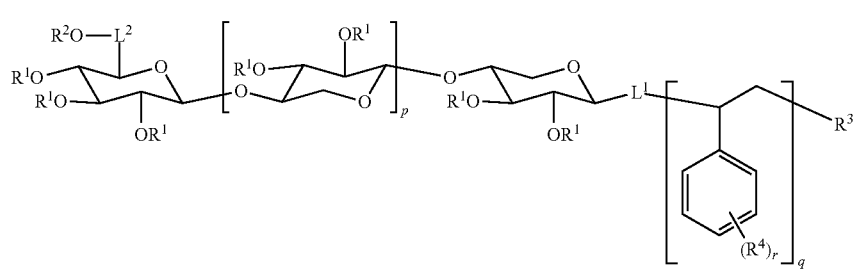

Formula (11)

wherein $R^1$ each independently represents a hydrogen atom, a fluorine atom, a bromine atom, a chlorine atom, an iodine atom, an alkyl group, an acyl group, an aryl group or a phosphoryl group, and a plurality of $R^1$ may be identical to or different from one another; $R^2$ represents a hydrogen atom or a substituent, $R^3$ represents a hydrogen atom or a substituent, and $R^4$ represents a hydrogen atom, a halogen atom, a hydroxyl group, an alkyl group, an acyl group, a trimethylsilyl group or a 1,1,2,2,2-pentamethyldisilyl group; $L^1$ represents a single bond or a linking group, and $L^2$ represents a single bond or an alkylene group; and p represents an integer of 2 or more and 1500 or less, q represents an integer of 2 or more and 3000 or less, and r represents an integer of 0 or more and 5 or less.

9. The self-assembly composition for pattern formation according to claim 1, wherein the block copolymer is represented by the following formula (13):

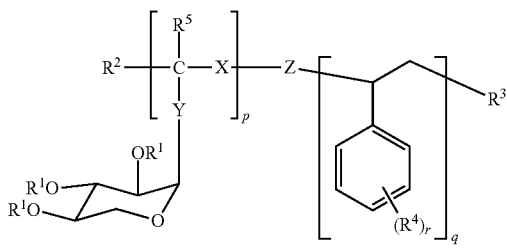

Formula (13)

wherein $R^1$ each independently represents a fluorine atom, a bromine atom, a chlorine atom, an iodine atom, an alkyl group, an acyl group, an aryl group or a phosphoryl group, and a plurality of $R^1$ may be identical to or different from one another; $R^2$ represents a hydrogen atom or a substituent, $R^3$ represents a hydrogen atom or a substituent, $R^4$ represents a hydrogen atom, a halogen atom, a hydroxyl group, an alkyl group, an acyl group, a trimethylsilyl group or a 1,1,2,2,2-pentamethyldisilyl group, $R^5$ represents a hydrogen atom or an alkyl group, and a plurality of $R^5$ may be identical to or different from one another; X, Y and Z each independently represent a single bond or a linking group, wherein a plurality of X may be identical to different from one another, and a plurality of Y may be identical to different from one another; and p represents an integer of 2 or more and 1500 or less, q represents an integer of 2 or more and 3000 or less, and r represents an integer of 0 or more and 5 or less.

10. The self-assembly composition for pattern formation according to claim 1, which further comprises an organic solvent.

11. The self-assembly composition for pattern formation according to claim 1, which further comprises an ionic liquid.

12. A pattern forming method, comprising
applying the self-assembly composition for pattern formation according to claim 1 on a substrate, so as to form a self-assembly film according to self-assembly phase separation, and
subjecting to etching.

13. The pattern forming method according to claim 12, wherein the etching is a dry etching.

14. The pattern forming method according to claim 12, which further comprises forming a guide pattern on the substrate before forming the pattern.

\* \* \* \* \*

UNITED STATES PATENT AND TRADEMARK OFFICE
CERTIFICATE OF CORRECTION

PATENT NO. : 10,982,032 B2
APPLICATION NO. : 16/063359
DATED : April 20, 2021
INVENTOR(S) : Kazuyo Morita Page 1 of 1

It is certified that error appears in the above-identified patent and that said Letters Patent is hereby corrected as shown below:

In the Claims

Claim 2, Column 43, between Lines 37 and 38, please insert

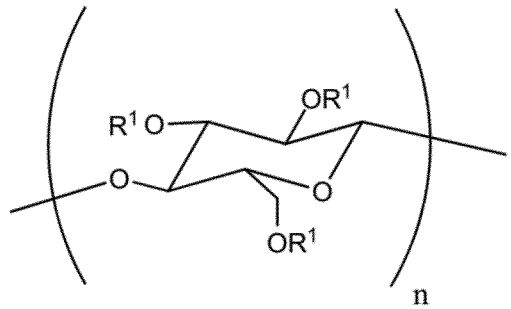

Formula (2)

-- --.

Claim 4, Column 44, Line 25, please delete "identical to different from", and insert --identical to or different from-- therefor.

Claim 8, Column 44, Lines 54-55, please delete "a hydrogen atom,".

Claim 9, Column 46, Lines 5-6, please delete "identical to different from", and insert --identical to or different from-- therefor.

Claim 9, Column 46, Lines 6-7, please delete "identical to different from", and insert --identical to or different from-- therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*